(12) United States Patent
Zhang et al.

(10) Patent No.: US 10,022,695 B2
(45) Date of Patent: Jul. 17, 2018

(54) MICRO-REACTOR ARRAY

(71) Applicants: CapitalBio Corporation, Beijing (CN); Tsinghua University, Beijing (CN)

(72) Inventors: Guanbin Zhang, Beijing (CN); Kaijun Zhao, Beijing (CN); Tao Sheng, Beijing (CN); Shuang An, Beijing (CN); Tao Guo, Beijing (CN); Jia Wang, Beijing (CN); Wanli Xing, Beijing (CN); Jing Cheng, Beijing (CN)

(73) Assignees: CapitalBio Corporation, Beijing (CN); Tsinghua University, Beijing (CN)

( * ) Notice: Subject to any disclaimer, the term of this patent is extended or adjusted under 35 U.S.C. 154(b) by 1042 days.

(21) Appl. No.: 14/073,745

(22) Filed: Nov. 6, 2013

(65) Prior Publication Data
US 2014/0128281 A1    May 8, 2014

(30) Foreign Application Priority Data
Nov. 7, 2012   (CN) .................... 2012 2 0583035 U

(51) Int. Cl.
*C12Q 1/68*   (2018.01)
*B01J 19/00*   (2006.01)

(52) U.S. Cl.
CPC ................ *B01J 19/0046* (2013.01)

(58) Field of Classification Search
None
See application file for complete search history.

(56) References Cited

U.S. PATENT DOCUMENTS

| | | | |
|---|---|---|---|
| 5,922,604 A * | 7/1999 | Stapleton | B01L 3/5027 422/417 |
| 7,767,438 B2 | 8/2010 | Xing et al. | |
| 8,293,519 B2 | 10/2012 | Xian et al. | |
| 2007/0054273 A1* | 3/2007 | Xian | B01L 3/50853 435/6.19 |
| 2012/0264650 A1* | 10/2012 | Luckey | B01L 3/5085 506/16 |

FOREIGN PATENT DOCUMENTS

| WO | WO-2004/074835 | 9/2004 |
|---|---|---|
| WO | WO-2005/012561 | 2/2005 |

OTHER PUBLICATIONS

Allawi and Santalucia, Jr., "Thermodynamics and NMR of internal G.T mismatches in DNA," Biochemistry (1997) 36:10581-10594.
Anderson and Young, "Quantitative Filter Hybridization," in *Nucleic Acid Hybridization. A Practical Approach*, Hames and Higgins (eds.), IRL Press, Oxford, UK, 1985, Chapter 4, pp. 73-111.
Kanehisa, "Use of statistical criteria for screening potential homologies in nucleic acid sequences," Nucleic Acids Res (1984) 12:203-213.

* cited by examiner

*Primary Examiner* — Betty J Forman
(74) *Attorney, Agent, or Firm* — Rimon, P.C.; Peng Chen

(57) ABSTRACT

The present disclosure provides a cover sheet for a microarray reaction device. In one aspect, the present cover sheet or device ensures the reaction units/volumes are stable and/or consistent among assay samples and assay runs, allowing samples (e.g., reaction solutions) to be conveniently added and distributed uniformly.

22 Claims, 4 Drawing Sheets

MICRO-REACTOR ARRAY

CROSS-REFERENCE TO RELATED APPLICATIONS

This application claims priority from Chinese Patent Application No. 201220583035.9, filed Nov. 7, 2012, published as CN 202942869 U, published May 22, 2013, the disclosures of which are incorporated herein by reference in their entireties for all purposes.

TECHNICAL FIELD

The present disclosure generally relates to the field of microarray devices and uses thereof. In particular, the present disclosure provides a cover sheet and a microarray reaction device comprising the cover sheet, for example, for use in a biological assay. Articles of manufacture and kits comprising the microarray reaction device and assaying methods using the same are also provided.

BACKGROUND

In the following discussion, certain articles and methods are described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

Taking a gene chip as an example, current microarray chip comprises a substrate and a coverslip. The substrate is often a standard slide with the size of 1 inch by 3 inch, and the coverslip is often a flat plastic or glass plate. There exist several shortcomings for the existing microarray chips. First, because of the short depth of the hybridization solutions, relatively fewer molecules can participate in the hybridization reactions, resulting in lower hybridization signals. Second, because a standard-sized slide is used, a relatively large amount of sample is needed to cover the slide, which may result in wasting precious and/or expensive samples. Third, when multiple samples are analyzed on a single slide, cross-contamination can easily occur and reduce reliability of the assay. Fourth, when multiple samples are analyzed on a single slide, it is often necessary to search for microarray locations for attaching probes thereupon, rendering the operation inconvenient and reducing speed and reliability of assay. Fifth, after the hybridization solution is injected to the slide, the coverslip is then positioned to the slide, requiring users to take enough care to avoid producing bubbles. Thus, there is room for improvement in the current microarray chip design.

SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

In some aspects, the present disclosure addresses the above and other related concerns relating to microarray chips.

In one embodiment, provided herein is a microarray reaction device, comprising: a chip provided with one or more latticed areas; a cover sheet provided with one or more bosses, wherein the cover sheet is capable of combining with the chip to form a reaction room between the latticed area and the boss; one or more through-holes on the one or more bosses, wherein each through-hole extends to the other side of the cover sheet; and at least three support structures. In one aspect, the support structures and the bosses are on the same side of the cover sheet.

In any of the preceding embodiments, at least one of the support structures can be located at the center of the cover sheet. In any of the preceding embodiments, the height of the support structure can be higher than that of the boss. In any of the preceding embodiments, the number of through-holes and the number of bosses can be equal or unequal. In any of the preceding embodiments, the through-holes arranged in a straight line can be arranged in a single row or multiple rows.

In any of the preceding embodiments, the interval of the through-holes in a straight line can be equal to the interval of the nozzles of a multi-channel pipette, or can be equal to multiple intervals of the nozzles of a multi-channel pipette.

In any of the preceding embodiments, the cross-sections of the through-holes can be circular, elliptical, oval, square, rectangular, or of an irregular shape. In any of the preceding embodiments, the surfaces of the bosses can be plane or curved surfaces. In any of the preceding embodiments, the cross-sections of the bosses can be square, rectangular, circular, elliptical, oval, or of an irregular shape. In any of the preceding embodiments, the shapes of the support structures can be cylindrical, rectangular, elliptical, of another shape, or of an irregular shape.

In any of the preceding embodiments, the heights of the support structures can be equal. In any of the preceding embodiments, the height of the support structure can be higher than the height of the boss by about 0.01 mm to about 10 mm. In any of the preceding embodiments, the material of the cover sheet can be or comprises plastic, glass, silicon, ceramics, or at least one kind of metal.

In any of the preceding embodiments, the cover sheet and the boss can be integrally molded or separately molded.

In another aspect, disclosed herein is a microarray reaction device, comprising: a microarray chip comprising one or more array areas; and a cover sheet, comprising: (1) one or more bosses, each boss corresponding to an array area on the microarray chip; (2) one or more through-holes on at least one of the bosses, wherein the through-holes extend from one side of the cover sheet to the other side; and (3) at least two support structures, wherein the support structures and the bosses are on the same side of the cover sheet. In one aspect, the cover sheet is capable of combining with the microarray chip to form a reaction volume between each boss on the cover sheet and the corresponding array area on the chip.

In any of the preceding embodiments, the cover sheet can comprise at least about 2, 3, 4, 5, 6, 7, 8, 9, 10, 11, 12, 13, 14, 15, 16, 17, 18, 19, or 20 support structures.

In any of the preceding embodiments, at least one of the support structures can be located substantially at the center of the cover sheet. In any of the preceding embodiments, at least one of the support structures can be located substantially at a corner of the cover sheet.

In any of the preceding embodiments, the height of the support structure can be higher than that of the boss. In any of the preceding embodiments, the number of the through-holes and the number of the bosses can be equal or unequal.

In any of the preceding embodiments, the through-holes can be arranged in a straight line. In any of the preceding embodiments, the through-holes can be arranged in a single row or multiple rows. In any of the preceding embodiments, the distance between two adjacent through-holes can be equal to the distance between two adjacent nozzles of a multi-channel pipette, or can be equal to the distance between two adjacent nozzles of a multi-channel pipette multiplied by an integer n.

In any of the preceding embodiments, the cross-sections of the through-holes can be circular, elliptical, oval, square, rectangular, or of an irregular shape. In any of the preceding embodiments, the surfaces of the bosses can be plane or curved surfaces. In any of the preceding embodiments, the cross-sections of the bosses can be square, rectangular, circular, elliptical, oval, or of an irregular shape. In any of the preceding embodiments, the shapes of the support structures can be cylindrical, rectangular, elliptical, of another shape, or of an irregular shape.

In any of the preceding embodiments, the heights of the support structures can be equal among the support structures. In any of the preceding embodiments, the height of the support structure can be higher than the height of the boss by about 0.01 mm to about 10 mm.

In any of the preceding embodiments, the material of the cover sheet can comprise plastic, glass, silicon, ceramics, or at least one kind of metal, or any combination thereof.

In any of the preceding embodiments, the cover sheet and the boss can be integrally molded or separately molded.

In yet another aspect, disclosed herein is a cover sheet comprising one or more bosses and at least two support structures on the same side of the cover sheet, wherein at least one boss comprises one or more through-holes extending from one side of the cover sheet to the other side. In one embodiment, the cover sheet is for delivering a sample or reagent to a reaction volume.

In any of the preceding embodiments, the sample or reagent can be added to the reaction volume through the one or more through-holes.

In any of the preceding embodiments, the cover sheet can be capable of combining with an assay plate to form a reaction volume between each boss and the assay plate.

In any of the preceding embodiments, the cover sheet can comprise at least about 2, 3, 4, 5, 6, 7, 8, 9, 10, 11, 12, 13, 14, 15, 16, 17, 18, 19, or 20 support structures.

In any of the preceding embodiments, at least one of the support structures can be located substantially at the center of the cover sheet. In any of the preceding embodiments, at least one of the support structures can be located substantially at a corner of the cover sheet.

In any of the preceding embodiments, the height of the support structure can be higher than that of the boss. In any of the preceding embodiments, the number of through-holes and the number of bosses can be equal or unequal.

In any of the preceding embodiments, the through-holes can be arranged in a straight line. In any of the preceding embodiments, the through-holes can be arranged in a single row or multiple rows.

In any of the preceding embodiments, the distance between two adjacent through-holes can be equal to the distance between two adjacent nozzles of a multi-channel pipette, or can be equal to the distance between two adjacent nozzles of a multi-channel pipette multiplied by an integer.

In any of the preceding embodiments, the cross-sections of the through-holes can be circular, elliptical, oval, square, rectangular, or of an irregular shape. In any of the preceding embodiments, the surfaces of the bosses can be plane or curved surfaces. In any of the preceding embodiments, the cross-sections of the bosses can be square, rectangular, circular, elliptical, oval, or of an irregular shape. In any of the preceding embodiments, the shapes of the support structures can be cylindrical, rectangular, elliptical, of another shape, or of an irregular shape.

In any of the preceding embodiments, the heights of the support structures can be equal among the support structures. In any of the preceding embodiments, the height of the support structure can be higher than the height of the boss by about 0.01 mm to about 10 mm.

In any of the preceding embodiments, the material of the cover sheet can comprise plastic, glass, silicon, ceramics, or at least one kind of metal.

In any of the preceding embodiments, the cover sheet and the boss can be integrally molded or separately molded.

In yet another aspect, disclosed herein is an assay device, comprising: an assay plate; and the cover sheet of any of the embodiments disclosed herein, wherein a reaction volume is formed between each of the bosses and the assay plate. In another aspect, provided herein is a method for conducting an assay, comprising: providing the assay device of any of the embodiments disclosed herein; delivering a sample to the reaction volume; allowing a reaction of the assay to occur in the reaction volume; and assessing the assay result.

In yet another aspect, disclosed herein is a method for conducting an assay, comprising: providing the microarray reaction device of any of the embodiments disclosed herein; delivering a sample to the reaction room or reaction volume; allowing a reaction of the assay to occur in the reaction room or reaction volume; and assessing the assay result.

In another aspect, provided herein is an article of manufacture, comprising: a packaging material; and the microarray reaction device of any of the embodiments disclosed herein, the cover sheet of any of the embodiments disclosed herein, or the assay device of any of the embodiments disclosed herein. In one aspect, the article of manufacture further comprises a label and/or an instruction.

In another aspect, provided herein is a kit comprising the microarray reaction device of any of the embodiments disclosed herein, the cover sheet of any of the embodiments disclosed herein, or the assay device of any of the embodiments disclosed herein, or the article of manufacture of any of the embodiments disclosed herein. In one embodiment, the kit further comprises one or more reagents for performing an assay. In one aspect, the kit further comprises a reference sample for performing the assay. In one aspect, the kit further comprises an instruction for interpreting a result of the assay performed using the kit.

DETAILED DESCRIPTION

Figure 1:
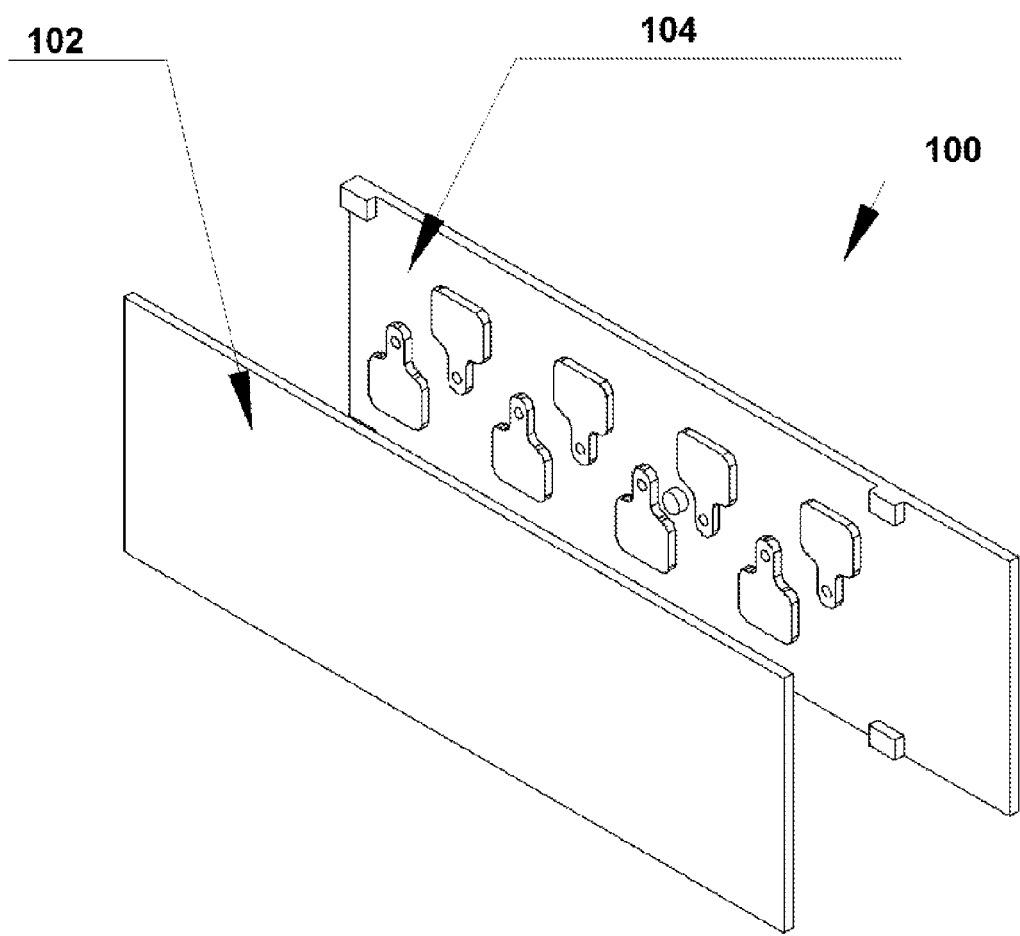
FIG. 1 is a schematic drawing of a device according to one embodiment of the present disclosure.

A detailed description of one or more embodiments of the claimed subject matter is provided below along with accompanying figures that illustrate the principles of the claimed subject matter. The claimed subject matter is described in connection with such embodiments, but is not limited to any particular embodiment. It is to be understood that the claimed subject matter may be embodied in various forms, and encompasses numerous alternatives, modifications and equivalents. Therefore, specific details disclosed herein are not to be interpreted as limiting, but rather as a basis for the claims and as a representative basis for teaching one skilled in the art to employ the claimed subject matter in virtually any appropriately detailed system, structure, or manner. Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art.

All publications, including patent documents and scientific articles, referred to in this application are incorporated by reference in their entireties for all purposes to the same extent as if each individual publication were individually incorporated by reference. If a definition set forth herein is contrary to or otherwise inconsistent with a definition set forth in the patents, patent applications, published applications or other publications that are herein incorporated by reference, the definition set forth herein prevails over the definition that is incorporated herein by reference. Citation of the publications or documents is not intended as an admission that any of them is pertinent prior art, nor does it constitute any admission as to the contents or date of these publications or documents.

All headings are for the convenience of the reader and should not be used to limit the meaning of the text that follows the heading, unless so specified.

As used herein and in the appended claims, the singular forms "a," "an," and "the" include plural referents unless the context clearly dictates otherwise. For example, "a" or "an" means "at least one" or "one or more." Thus, reference to "a through-hole" refers to one or more through-holes, and reference to "the method" includes reference to equivalent steps and methods disclosed herein and/or known to those skilled in the art, and so forth.

Throughout this disclosure, various aspects of the claimed subject matter are presented in a range format. It should be understood that the description in range format is merely for convenience and brevity and should not be construed as an inflexible limitation on the scope of the claimed subject matter. Accordingly, the description of a range should be considered to have specifically disclosed all the possible sub-ranges as well as individual numerical values within that range. For example, where a range of values is provided, it is understood that each intervening value, between the upper and lower limit of that range and any other stated or intervening value in that stated range is encompassed within the claimed subject matter. The upper and lower limits of these smaller ranges may independently be included in the smaller ranges, and are also encompassed within the claimed subject matter, subject to any specifically excluded limit in the stated range. Where the stated range includes one or both of the limits, ranges excluding either or both of those included limits are also included in the claimed subject matter. This applies regardless of the breadth of the range.

As used herein, "microarray chip" refers to a solid substrate with a plurality of one-, two- or three-dimensional micro structures or micro-scale structures on which certain processes, such as physical, chemical, biological, biophysical or biochemical processes, etc., can be carried out. The micro structures or micro-scale structures such as, channels and wells, are incorporated into, fabricated on or otherwise attached to the substrate for facilitating physical, biophysical, biological, biochemical, chemical reactions or processes on the chip. The chip may be thin in one dimension and may have various shapes in other dimensions, for example, a rectangle, a circle, an ellipse, or other irregular shapes. The size of the major surface of chips can vary considerably, e.g., from about 1 $mm^2$ to about 0.25 $m^2$. Preferably, the size of the chips is from about 4 $mm^2$ to about 25 $cm^2$ with a characteristic dimension from about 1 mm to about 5 cm. The chip surfaces may be flat, or not flat. The chips with non-flat surfaces may include channels or wells fabricated on the surfaces.

As used herein, "gene" refers to the unit of inheritance that occupies a specific locus on a chromosome, the existence of which can be confirmed by the occurrence of different allelic forms. Given the occurrence of split genes, gene also encompasses the set of DNA sequences (exons) that are required to produce a single polypeptide. In one aspect, "gene chip" refers to an array of oligonucleotides immobilized on a surface that can be used to screen an RNA sample (after reverse transcription). Thus, a gene chip can be used in a method for rapidly determining which genes are being expressed in the cell or tissue from which the RNA is obtained.

In one embodiment, the reaction volumes between the cover sheet and the chip are substantially identical. For example, the reaction volumes between the bosses on the cover sheet and the corresponding array areas on the chip are substantially identical. As used herein, "substantially identical" reaction volumes mean that the differences among the reaction volumes are sufficiently small not to statistically affect assay uniformity. Normally, the difference between the largest volume and the smallest volume is less than about 50% of the largest reaction volume. Preferably, the difference between the largest volume and the smallest volume is less than about 40%, about 30%, about 20%, about 10%, about 5%, about 2%, about 1%, about 0.5%, about 0.1%, about 0.01%, or less than about 0.001% of the largest reaction volume.

As used herein, a "biological sample" includes any sample obtained from a living or viral (or prion) source or other source of macromolecules and biomolecules, and includes any cell type or tissue of a subject from which nucleic acid, protein and/or other macromolecule can be obtained. The biological sample can be a sample obtained directly from a biological source or a sample that is processed. For example, isolated nucleic acids that are amplified constitute a biological sample. Biological samples include, but are not limited to, body fluids, such as blood, plasma, serum, cerebrospinal fluid, synovial fluid, urine and sweat, tissue and organ samples from animals and plants and processed samples derived therefrom.

As used herein, a "composition" can be any mixture of two or more products or compounds. It may be a solution, a suspension, liquid, powder, a paste, aqueous, non-aqueous or any combination thereof. A biological sample of the present disclosure encompasses a sample in the form of a solution, a suspension, a liquid, a powder, a paste, an aqueous sample, or a non-aqueous sample.

The terms "polynucleotide," "oligonucleotide," "nucleic acid" and "nucleic acid molecule" are used interchangeably herein to refer to a polymeric form of nucleotides of any length, and comprise ribonucleotides, deoxyribonucleotides, and analogs or mixtures thereof. The terms include triple-, double- and single-stranded deoxyribonucleic acid ("DNA"), as well as triple-, double- and single-stranded ribonucleic acid ("RNA"). It also includes modified, for example by alkylation, and/or by capping, and unmodified forms of the polynucleotide. More particularly, the terms "polynucleotide," "oligonucleotide," "nucleic acid," and "nucleic acid molecule" include polydeoxyribonucleotides (containing 2-deoxy-D-ribose), polyribonucleotides (containing D-ribose), including tRNA, rRNA, hRNA, and mRNA, whether spliced or unspliced, any other type of polynucleotide which is an N- or C-glycoside of a purine or pyrimidine base, and other polymers containing nonnucleotidic backbones, for example, polyamide (e.g., peptide nucleic acids ("PNAs")) and polymorpholino (commercially available from the Anti-Virals, Inc., Corvallis, Oreg., as Neugene) polymers, and other synthetic sequence-specific nucleic acid polymers providing that the polymers contain nucleobases in a configuration which allows for base pairing and base stacking, such as is found in DNA and RNA. Thus, these terms include, for example, 3'-deoxy-2',5'-DNA, oligodeoxyribonucleotide N3' to P5' phosphoramidates, 2'-O-alkyl-substituted RNA, hybrids between DNA and RNA or between PNAs and DNA or RNA, and also include known types of modifications, for example, labels, alkylation, "caps," substitution of one or more of the nucleotides with an analog, inter-nucleotide modifications such as, for example, those with uncharged linkages (e.g., methyl phosphonates, phosphotriesters, phosphoramidates, carbamates, etc.), with negatively charged linkages (e.g., phosphorothioates, phosphorodithioates, etc.), and with positively charged linkages (e.g., aminoalkylphosphoramidates, aminoalkylphosphotriesters), those containing pendant moieties, such as, for example, proteins (including enzymes (e.g. nucleases), toxins, antibodies, signal peptides, poly-L-lysine, etc.), those with intercalators (e.g., acridine, psoralen, etc.), those containing chelates (of, e.g., metals, radioactive metals, boron, oxidative metals, etc.), those containing alkylators, those with modified linkages (e.g., alpha anomeric nucleic acids, etc.), as well as unmodified forms of the polynucleotide or oligonucleotide. A nucleic acid generally will contain phosphodiester bonds, although in some cases nucleic acid analogs may be included that have alternative backbones such as phosphoramidate, phosphorodithioate, or methylphophoroamidite linkages; or peptide nucleic acid backbones and linkages. Other analog nucleic acids include those with bicyclic structures including locked nucleic acids, positive backbones, non-ionic backbones and non-ribose backbones. Modifications of the ribose-phosphate backbone may be done to increase the stability of the molecules; for example, PNA:DNA hybrids can exhibit higher stability in some environments. The terms "polynucleotide," "oligonucleotide," "nucleic acid" and "nucleic acid molecule" can comprise any suitable length, such as at least 5, 6, 7, 8, 9, 10, 20, 30, 40, 50, 100, 200, 300, 400, 500, 1,000 or more nucleotides.

It will be appreciated that, as used herein, the terms "nucleoside" and "nucleotide" include those moieties which contain not only the known purine and pyrimidine bases, but also other heterocyclic bases which have been modified. Such modifications include methylated purines or pyrimidines, acylated purines or pyrimidines, or other heterocycles. Modified nucleosides or nucleotides can also include modifications on the sugar moiety, e.g., wherein one or more of the hydroxyl groups are replaced with halogen, aliphatic groups, or are functionalized as ethers, amines, or the like. The term "nucleotidic unit" is intended to encompass nucleosides and nucleotides.

The terms "polypeptide," "oligopeptide," "peptide," and "protein" are used interchangeably herein to refer to polymers of amino acids of any length, e.g., at least 5, 6, 7, 8, 9, 10, 20, 30, 40, 50, 100, 200, 300, 400, 500, 1,000 or more amino acids. The polymer may be linear or branched, it may comprise modified amino acids, and it may be interrupted by non-amino acids. The terms also encompass an amino acid polymer that has been modified naturally or by intervention; for example, disulfide bond formation, glycosylation, lipidation, acetylation, phosphorylation, or any other manipulation or modification, such as conjugation with a labeling component. Also included within the definition are, for example, polypeptides containing one or more analogs of an amino acid (including, for example, unnatural amino acids, etc.), as well as other modifications known in the art.

The terms "binder," "binding agent," "binding moiety," and "binding group" as used herein refer to any agent or any moiety or group thereof that specifically binds to an analyte molecule of interest, e.g., a biological molecule or portions or complexes thereof with other molecules.

An analyte that can be detected and/or analyzed using the device or cover sheet disclosed herein can be any biological molecules including but not limited to proteins, nucleic acids, lipids, carbohydrates, ions, or multicomponent complexes containing any of the above. Examples of subcellular analytes of interest include organelles, e.g., mitochondria, Golgi apparatus, endoplasmic reticulum, chloroplasts, endocytic vesicles, exocytic vesicles, vacuoles, lysosomes, etc. Exemplary nucleic acid analyte can include genomic DNA of various conformations (e.g., A-DNA, B-DNA, Z-DNA), mitochondria DNA (mtDNA), mRNA, tRNA, rRNA, hRNA, miRNA, and piRNA.

As used herein, the term "binding" refers to an attractive interaction between two molecules which results in a stable association in which the molecules are in close proximity to each other. Molecular binding can be classified into the following types: non-covalent, reversible covalent and irreversible covalent. Molecules that can participate in molecular binding include proteins, nucleic acids, carbohydrates, lipids, and small organic molecules such as pharmaceutical compounds. For example, proteins that form stable complexes with other molecules are often referred to as receptors while their binding partners are called ligands. Nucleic acids can also form stable complex with themselves or others, for example, DNA-protein complex, DNA-DNA complex, DNA-RNA complex.

As used herein, the term "specific binding" refers to the specificity of a binder, e.g., an antibody, such that it preferentially binds to a target, such as a polypeptide antigen. When referring to a binding partner, e.g., protein, nucleic acid, antibody or other affinity capture agent, etc., "specific binding" can include a binding reaction of two or more binding partners with high affinity and/or complementarity to ensure selective hybridization under designated assay conditions. Typically, specific binding will be at least three times the standard deviation of the background signal. Thus, under designated conditions the binding partner binds to its particular target molecule and does not bind in a significant amount to other molecules present in the sample. Recognition by a binder or an antibody of a particular target in the presence of other potential interfering substances is one characteristic of such binding. Preferably, binders, antibodies or antibody fragments that are specific for or bind specifically to a target bind to the target with higher affinity than binding to other non-target substances. Also preferably, binders, antibodies or antibody fragments that are specific for or bind specifically to a target avoid binding to a significant percentage of non-target substances, e.g., non-target substances present in a testing sample. In some embodiments, binders, antibodies or antibody fragments of the present disclosure avoid binding greater than about 90% of non-target substances, although higher percentages are clearly contemplated and preferred. For example, binders, antibodies or antibody fragments of the present disclosure avoid binding about 91%, about 92%, about 93%, about 94%, about 95%, about 96%, about 97%, about 98%, about 99%, and about 99% or more of non-target substances. In other embodiments, binders, antibodies or antibody fragments of the present disclosure avoid binding greater than about 10%, 20%, 30%, 40%, 50%, 60%, or 70%, or greater than about 75%, or greater than about 80%, or greater than about 85% of non-target substances.

The terms "capture agent" and "capture group" as used herein refer to any moiety that allows capture of an analyte via binding to or linkage with an affinity group or domain on the analyte. The binding between the capture agent and its affinity tag may be a covalent bond and/or a non-covalent bond. A capture agent includes, e.g., a member of a binding pair that selectively binds to an affinity tag on a fusion peptide, a chemical linkage that is added by recombinant technology or other mechanisms, co-factors for enzymes and the like. Capture agents can be associated with an array or cover sheet of the present disclosure using conventional techniques including hybridization, cross-linking (e.g., covalent immobilization using a furocoumarin such as psoralen), attachment via chemically-reactive groups, and the like.

The term "antibody" as used herein includes an entire immunoglobulin or antibody or any functional fragment of an immunoglobulin molecule which is capable of specific binding to an antigen, such as a carbohydrate, polynucleotide, lipid, polypeptide, or a small molecule, etc., through at least one antigen recognition site, located in the variable region of the immunoglobulin molecule, and can be an immunoglobulin of any class, e.g., IgG, IgM, IgA, IgD and IgE. IgY, which is the major antibody type in avian species such as chicken, is also included. Secreted antibodies can be dimeric with two Ig units as with IgA, tetrameric with four Ig units like teleost fish IgM, or pentameric with five Ig units, like mammalian IgM.

An antibody includes the entire antibody as well as any antibody fragments capable of binding the antigen or antigenic fragment, for example, an epitope, of interest. Examples include complete antibody molecules, antibody fragments or linked antibody fragments, such as Fab, F(ab')$_2$, chemically linked F(ab')$_2$, Fab', scFv (single-chain variable fragment), di-scFv, sdAb (single domain antibody), trifunctional antibody, BiTE (bi-specific T-cell engager), CDRs, $V_L$, $V_H$, and any other portion of an antibody which is capable of specifically binding to an antigen. Antibodies used herein are immunoreactive or immunospecific for, and therefore specifically and selectively bind to, for example, proteins either detected (i.e., analytes in biological samples) or used for detection (i.e., binders or probes) in the assays disclosed herein. An antibody as used herein can be specific for any of the analytes, binders, or epitopes disclosed herein or any combinations thereof. In certain embodiments, an analyte itself of the present disclosure can be an antibody or fragments thereof.

As used herein, a "fragment thereof" "region thereof" and "portion thereof" can refer to fragments, regions and portions that substantially retain at least one function of the full length polypeptide.

As used herein, the term "antigen" may refer to a target molecule that is specifically bound by an antibody through its antigen recognition site. The antigen may be monovalent or polyvalent, i.e., it may have one or more epitopes recognized by one or more antibodies. Examples of kinds of antigens that can be recognized by antibodies include polypeptides, oligosaccharides, glycoproteins, polynucleotides, lipids, or small molecules, etc.

As used herein, the term "epitope" can refer to a peptide sequence of at least about 3 to 5, preferably about 5 to 10 or 15, and not more than about 1,000 amino acids (or any integer there between), which define a sequence that by itself or as part of a larger sequence, binds to an antibody generated in response to such sequence. There is no critical upper limit to the length of the fragment, which may, for example, comprise nearly the full-length of the antigen sequence, or even a fusion protein comprising two or more epitopes from the target antigen. An epitope for use in the present disclosure is not limited to a peptide having the exact sequence of the portion of the parent protein from which it is derived, but also encompasses sequences identical to the native sequence, as well as modifications to the native sequence, such as deletions, additions and substitutions (conservative in nature).

The terms "complementary" and "substantially complementary" include the hybridization or base pairing or the formation of a duplex between nucleotides or nucleic acids, for instance, between the two strands of a double-stranded DNA molecule or between an oligonucleotide primer and a primer binding site on a single-stranded nucleic acid. Complementary nucleotides are, generally, A and T (or A and U), or C and G. Two single-stranded RNA or DNA molecules are said to be substantially complementary when the nucleotides of one strand, optimally aligned and compared and with appropriate nucleotide insertions or deletions, pair with at least about 80% of the other strand, usually at least about 90% to about 95%, and even about 98% to about 100%. In one aspect, two complementary sequences of nucleotides are capable of hybridizing, preferably with less than 25%, more preferably with less than 15%, even more preferably with less than 5%, most preferably with no mismatches between opposed nucleotides. Preferably the two molecules will hybridize under conditions of high stringency.

"Hybridization" as used herein may refer to the process in which two single-stranded polynucleotides bind non-covalently to form a stable double-stranded polynucleotide. In one aspect, the resulting double-stranded polynucleotide can be a "hybrid" or "duplex." "Hybridization conditions" typically include salt concentrations of approximately less than 1 M, often less than about 500 mM and may be less than about 200 mM. A "hybridization buffer" includes a buffered salt solution such as 5% SSPE, or other such buffers known in the art. Hybridization temperatures can be as low as 5° C., but are typically greater than 22° C., and more typically greater than about 30° C., and typically in excess of 37° C. Hybridizations are often performed under stringent conditions, i.e., conditions under which a sequence will hybridize to its target sequence but will not hybridize to other, non-complementary sequences. Stringent conditions are sequence-dependent and are different in different circumstances. For example, longer fragments may require higher hybridization temperatures for specific hybridization than short fragments. As other factors may affect the stringency of hybridization, including base composition and length of the complementary strands, presence of organic solvents, and the extent of base mismatching, the combination of parameters is more important than the absolute measure of any one parameter alone. Generally stringent conditions are selected to be about 5° C. lower than the $T_m$ for the specific sequence at a defined ionic strength and pH. The melting temperature $T_m$ can be the temperature at which a population of double-stranded nucleic acid molecules becomes half dissociated into single strands. Several equations for calculating the $T_m$ of nucleic acids are well known in the art. As indicated by standard references, a simple estimate of the $T_m$ value may be calculated by the equation, $T_m=81.5+0.41$ (% G+C), when a nucleic acid is in aqueous solution at 1 M NaCl (see e.g., Anderson and Young, Quantitative Filter Hybridization, in *Nucleic Acid Hybridization* (1985)). Other references (e.g., Allawi and SantaLucia, Jr., Biochemistry, 36:10581-94 (1997)) include alternative methods of computation which take structural and environmental, as well as sequence characteristics into account for the calculation of $T_m$.

In general, the stability of a hybrid is a function of the ion concentration and temperature. Typically, a hybridization reaction is performed under conditions of lower stringency, followed by washes of varying, but higher, stringency. Exemplary stringent conditions include a salt concentration of at least 0.01 M to no more than 1 M sodium ion concentration (or other salt) at a pH of about 7.0 to about 8.3 and a temperature of at least 25° C. For example, conditions of 5×SSPE (750 mM NaCl, 50 mM sodium phosphate, 5 mM EDTA at pH 7.4) and a temperature of approximately 30° C. are suitable for allele-specific hybridizations, though a suitable temperature depends on the length and/or GC content of the region hybridized. In one aspect, "stringency of hybridization" in determining percentage mismatch can be as follows: 1) high stringency: 0.1×SSPE, 0.1% SDS, 65° C.; 2) medium stringency: 0.2×SSPE, 0.1% SDS, 50° C. (also referred to as moderate stringency); and 3) low stringency: 1.0×SSPE, 0.1% SDS, 50° C. It is understood that equivalent stringencies may be achieved using alternative buffers, salts and temperatures. For example, moderately stringent hybridization can refer to conditions that permit a nucleic acid molecule such as a probe to bind a complementary nucleic acid molecule. The hybridized nucleic acid molecules generally have at least 60% identity, including for example at least any of 70%, 75%, 80%, 85%, 90%, or 95% identity. Moderately stringent conditions can be conditions equivalent to hybridization in 50% formamide, 5×Denhardt's solution, 5×SSPE, 0.2% SDS at 42° C., followed by washing in 0.2×SSPE, 0.2% SDS, at 42° C. High stringency conditions can be provided, for example, by hybridization in 50% formamide, 5×Denhardt's solution, 5×SSPE, 0.2% SDS at 42° C., followed by washing in 0.1×SSPE, and 0.1% SDS at 65° C. Low stringency hybridization can refer to conditions equivalent to hybridization in 10% formamide, 5×Denhardt's solution, 6×SSPE, 0.2% SDS at 22° C., followed by washing in 1×SSPE, 0.2% SDS, at 37° C. Denhardt's solution contains 1% Ficoll, 1% polyvinylpyrolidone, and 1% bovine serum albumin (BSA). 20×SSPE (sodium chloride, sodium phosphate, EDTA) contains 3 M sodium chloride, 0.2 M sodium phosphate, and 0.025 M EDTA. Other suitable moderate stringency and high stringency hybridization buffers and conditions are well known to those of skill in the art and are described, for example, in Sambrook et al., Molecular Cloning: A Laboratory Manual, 2nd ed., Cold Spring Harbor Press, Plainview, N.Y. (1989); and Ausubel et al., Short Protocols in Molecular Biology, 4th ed., John Wiley & Sons (1999).

Alternatively, substantial complementarity exists when an RNA or DNA strand will hybridize under selective hybridization conditions to its complement. Typically, selective hybridization will occur when there is at least about 65% complementary over a stretch of at least 14 to 25 nucleotides, preferably at least about 75%, more preferably at least about 90% complementary. See M. Kanehisa, Nucleic Acids Res. 12:203 (1984).

A "primer" used herein can be an oligonucleotide, either natural or synthetic, that is capable, upon forming a duplex with a polynucleotide template, of acting as a point of initiation of nucleic acid synthesis and being extended from its 3' end along the template so that an extended duplex is formed. The sequence of nucleotides added during the extension process is determined by the sequence of the template polynucleotide. Primers usually are extended by a polymerase, for example, a DNA polymerase.

"Ligation" may refer to the formation of a covalent bond or linkage between the termini of two or more nucleic acids, e.g., oligonucleotides and/or polynucleotides, in a template-driven reaction. The nature of the bond or linkage may vary widely and the ligation may be carried out enzymatically or chemically. As used herein, ligations are usually carried out enzymatically to form a phosphodiester linkage between a 5' carbon terminal nucleotide of one oligonucleotide with a 3' carbon of another nucleotide.

"Sequence determination" and the like include determination of information relating to the nucleotide base sequence of a nucleic acid. Such information may include the identification or determination of partial as well as full sequence information of the nucleic acid. Sequence information may be determined with varying degrees of statistical reliability or confidence. In one aspect, the term includes the determination of the identity and ordering of a plurality of contiguous nucleotides in a nucleic acid. "High throughput sequencing" or "next generation sequencing" includes sequence determination using methods that determine many (typically thousands to billions) of nucleic acid sequences in an intrinsically parallel manner, i.e. where DNA templates are prepared for sequencing not one at a time, but in a bulk process, and where many sequences are read out preferably in parallel, or alternatively using an ultra-high throughput serial process that itself may be parallelized. Such methods include but are not limited to pyrosequencing (for example, as commercialized by 454 Life Sciences, Inc., Branford, Conn.); sequencing by ligation (for example, as commercialized in the SOLiD™ technology, Life Technologies, Inc., Carlsbad, Calif.); sequencing by synthesis using modified nucleotides (such as commercialized in TruSeq™ and HiSeq™ technology by Illumina, Inc., San Diego, Calif.; HeliScope™ by Helicos Biosciences Corporation, Cambridge, Mass.; and PacBio RS by Pacific Biosciences of California, Inc., Menlo Park, Calif.), sequencing by ion detection technologies (such as Ion Torrent™ technology, Life Technologies, Carlsbad, Calif.); sequencing of DNA nanoballs (Complete Genomics, Inc., Mountain View, Calif.); nanopore-based sequencing technologies (for example, as developed by Oxford Nanopore Technologies, LTD, Oxford, UK), and like highly parallelized sequencing methods.

"Multiplexing" or "multiplex assay" herein may refer to an assay or other analytical method in which the presence and/or amount of multiple targets, e.g., multiple nucleic acid sequences, can be assayed simultaneously by using more than one capture probe conjugate, each of which has at least one different detection characteristic, e.g., fluorescence characteristic (for example excitation wavelength, emission wavelength, emission intensity, FWHM (full width at half maximum peak height), or fluorescence lifetime) or a unique nucleic acid or protein sequence characteristic.

Microarray Reaction Devices

Manufacture and use of microarray reaction devices are disclosed in Chinese Patent Application No. 03104663.0 (see also U.S. Pat. No. 7,767,438 B2), and Chinese Patent Application No. 03150086.2 (see also U.S. Pat. No. 8,293, 519 B2), the disclosures of which are incorporated herein by reference in their entireties for all purposes.

In one aspect, the present disclosure provides a microarray reaction device with a structure that makes it easy to operate and manufacture the device. In particular aspects, the devices, cover sheets, and/or methods disclosed herein enable bulk-sampling. In some aspects, the present devices, cover sheets, and/or methods are used in multiplexed assays.

In one aspect, the microarray reaction device comprises a microarray chip and a cover sheet. In one embodiment, the present microarray reaction device provides stable reaction units, for example, those provided between the microarray chip and the cover sheet. In one aspect, the present disclosure provides reliable precision for adding a sample (e.g., a reaction solution), or adding a plurality of samples in a batch format (e.g., using a multichannel pipette). In another aspect, the sample (e.g., a reaction solution) added to a microarray reaction device of the present disclosure is evenly and/or uniformly distributed, for example, within each reaction volume or among a plurality of reaction volumes. In one embodiment, the reaction volumes are substantially identical. Accordingly, assay results using the present microarray reaction device are repeatable and reliable.

In one aspect, the microarray reaction device contains the following components:

(1) a chip. The chip contains several lattice areas;
(2) a cover sheet. The cover sheet contains several bosses. When the cover sheet combines with the chip, a reaction room is formed between a lattice area and a boss;
(3) several through-holes. Each cover sheet has a through-hole and the through-hole extends to the other side of the cover sheet; and
(4) at least three support structures. The support structures and the bosses are on the same side of the cover sheet.

Any suitable chip, e.g., a microarray chip, can be used in the present microarray reaction devices. For example, the microarray chip can be a slide. In one aspect, a boss on the cover sheet has a corresponding array area on the chip, such that when the cover sheet and the chip are combined or aligned, the corresponding boss and array area form a reaction volume/room/space. The reaction volume can be used for any suitable reactions, for example, PCR, ligation, sequencing (e.g., polypeptide sequencing, or nucleic acid sequencing), or immunoaffinity reaction (e.g., between an antibody or an antigen/epitope).

In one aspect, the cover sheet further comprises one or more through-holes for delivering a sample, for example, a fluid sample containing an analyte of interest, into a plurality of reaction volumes. The number of the through-holes can range from about 1 to about 2,500. In some aspects, the number of the through-holes is between about 1 and about 5, between about 5 and about 10, between about 10 and about 50, between about 50 and about 100, between about 100 and about 200, between about 200 and about 300, between about 300 and about 400, between about 400 and about 500, between about 500 and about 600, between about 600 and about 700, between about 700 and about 800, between about 800 and about 900, between about 900 and about 1000, between about 1000 and about 1200, between about 1200 and about 1400, between about 1400 and about 1600, between about 1600 and about 1800, between about 1800 and about 2000, between about 2000 and about 2400, between about 2400 and about 2500, or more than about 2500. The microarray reaction device can have identical or different numbers of the through-holes and the bosses.

The through-holes can have any suitable dimensions and shapes. In one example, the transverse cross-section of the through-holes has a shape selected from the group consisting of a square, a rectangle, a circle, an ellipse, an oval and an irregular shape. In another example, the through-holes have a diameter ranging from about 0.01 mm to about 100 mm. In some aspects, the diameter of each through-hole or the average diameter of the through-holes is between about 0.01 mm to about 0.05 mm, between about 0.05 mm to about 0.1 mm, between about 0.1 mm to about 0.5 mm, between about 0.5 mm to about 1 mm, between about 1 mm to about 5 mm, between about 5 mm to about 10 mm, between about 10 mm to about 50 mm, between about 50 mm to about 100 mm, or more than about 100 mm.

The present microarray reaction device can have any suitable number of the bosses on the cover sheet and/or the array areas (e.g., microarray areas) on the chip. In one example, the number of the bosses ranges from about 2 to about 2,500. In some aspects, the number of the bosses is between about 1 and about 5, between about 5 and about 10, between about 10 and about 50, between about 50 and about 100, between about 100 and about 200, between about 200 and about 300, between about 300 and about 400, between about 400 and about 500, between about 500 and about 600, between about 600 and about 700, between about 700 and about 800, between about 800 and about 900, between about 900 and about 1000, between about 1000 and about 1200, between about 1200 and about 1400, between about 1400 and about 1600, between about 1600 and about 1800, between about 1800 and about 2000, between about 2000 and about 2400, between about 2400 and about 2500, or more than about 2500. In another example, the microarray reaction device has identical or different number of the bosses and the array areas.

The bosses and the array areas can have any suitable dimensions and shapes. In one example, the bosses and the array areas have identical or different shape(s) and/or surface area(s). In another example, the height of the bosses ranges from about 0.01 mm to about 50 mm. In some aspects, the height of each boss or the average height of the bosses is between about 0.01 mm to about 0.05 mm, between about 0.05 mm to about 0.1 mm, between about 0.1 mm to about 0.5 mm, between about 0.5 mm to about 1 mm, between about 1 mm to about 5 mm, between about 5 mm to about 10 mm, between about 10 mm to about 50 mm, or more than about 50 mm.

In still another example, the surface of the bosses has a shape selected from the group consisting of a square, a rectangle, a circle, an ellipse, an oval and an irregular shape. In yet another example, the surface area of the bosses has an area ranging from about 0.01 mm$^2$ to about 600 mm$^2$. In some aspects, the surface area of each boss or the average surface area of the bosses is between about 0.01 mm$^2$ to about 0.05 mm$^2$, between about 0.05 mm$^2$ to about 0.10 mm$^2$, between about 0.1 mm$^2$ to about 0.5 mm$^2$, between about 0.5 mm$^2$ to about 1 mm$^2$, between about 1 mm$^2$ to about 5 mm$^2$, between about 5 mm$^2$ to about 10 mm$^2$, between about 10 mm$^2$ to about 50 mm$^2$, between about 50 mm$^2$ to about 100 mm$^2$, between about 100 mm$^2$ to about 500 mm$^2$, between about 500 mm$^2$ to about 600 mm$^2$, or more than about 600 mm$^2$.

In yet another example, the plurality of reaction volumes have a height ranging from about 0.001 mm to about 1 mm. In some aspects, the height of each reaction volume or the average height of the reaction volumes is between about 0.001 mm to about 0.005 mm, between about 0.005 mm to about 0.01 mm, between about 0.01 mm to about 0.05 mm, between about 0.05 mm to about 0.1 mm, between about 0.1 mm to about 0.5 mm, between about 0.5 mm to about 1 mm, or more than about 1 mm.

In yet another example, the plurality of reaction volumes have a volume ranging from about 0.01 mm$^3$ to about 600 mm$^3$. In some aspects, the volume of each reaction volume or the average volume of the reaction volumes is between about 0.01 mm$^3$ to about 0.05 mm$^3$, between about 0.05 mm$^3$ to about 0.1 mm$^3$, between about 0.1 mm$^3$ to about 0.5 mm$^3$, between about 0.5 mm$^3$ to about 1 mm$^3$, between about 1 mm$^3$ to about 5 mm$^3$, between about 5 mm$^3$ to about 10 mm$^3$, between about 10 mm$^3$ to about 50 mm$^3$, between about 50 mm$^3$ to about 100 mm$^3$, between about 100 mm$^3$ to about 500 mm$^3$, between about 500 mm$^3$ to about 600 mm$^3$, or more than about 600 mm.

The microarray chip and/or the cover sheet can comprise any suitable material. In one example, the microarray chip and/or the cover sheet comprise a material selected from the group consisting of a silicon, a plastic, a glass, a ceramic, a rubber, a metal, a polymer, a paper and a combination thereof. In another example, the cover sheet comprises a plastic. In one aspect, the cover sheet is injection molded. In another aspect, the plastic is selected from the group consisting of polycarbonate, methyl methacrylate, polystyrene, acrylonitrile-butadiene-styrene (ABS), polyethylene and polypropylene. In still another example, the cover sheet comprises a glass. In one aspect, the cover sheet is fabricated by a method selected from the group consisting of gluing, dicing/cutting, slicing, anodic bonding, ultrasonic welding, and a combination thereof.

In one aspect, the present cover sheet further comprises a reagent or substance that is useful for an assay using the cover sheet, for example, for assaying an analyte in a sample delivered through the through-holes of the bosses. In one embodiment, the reagent or substance is immobilized on the cover sheet. In one aspect, the reagent or substance is a capture agent. For example, the present cover sheet can further comprise a reagent immobilized on the surface of the boss which forms the upper layer of a reaction volume, and the reagent is capable of binding to an analyte in the sample delivered to the reaction volume. In another example, the present cover sheet further comprises an enzyme immobilized on the surface of the boss, and the enzyme catalyzes a reaction of an analyte in the sample delivered to the reaction volume. In still another example, the cover sheet comprises a reagent on the surface of the boss, and the reagent becomes solubilized upon delivery of a liquid sample or reagent.

In another aspect, the present disclosure is directed to an article of manufacture, which article of manufacture comprises: a) a packaging material; b) a microarray reaction device or cover sheet disclosed herein; optionally, c) a label indicating that the article is for an assay, for example, for assaying an analyte; and optionally, d) an instruction, for example, for using the article of manufacture for an assay.

The disclosure comprises kits comprising a microarray reaction device, a cover sheet, or an assay device disclosed herein. For example, kits for diagnosing or aiding in the diagnosis of a condition or a disease (e.g., cancer) or for monitoring a condition or a disease are included. In one embodiment, the kit comprises one or more reagents for detecting one or more analytes, for example, biomarkers associated with a condition or a disease. The reagents comprise labeled compounds or agents capable of detecting a polypeptide or an mRNA encoding a polypeptide corresponding to a biomarker in a biological sample, and means for determining the absence, presence, and/or amount of the polypeptide or mRNA in the sample (e.g., an antibody which binds the polypeptide or an oligonucleotide probe which binds to DNA or nRNA encoding the polypeptide). Suitable reagents for binding with a polypeptide corresponding to a biomarker include antibodies, antibody derivatives, antibody fragments, and the like. Suitable reagents for binding with a nucleic acid (e.g., a genomic DNA, an mRNA, a spliced mRNA, a cDNA, or the like) include complementary nucleic acids. In one embodiment, the kit comprises a reference sample. In one aspect, the reference sample is used to compare the results obtained from the sample being tested. The kit can also comprise other components such as a buffering agent, a preservative, or a protein stabilizing agent. The kit can further comprise components necessary for detecting a detectable label (e.g., an enzyme or a substrate).

Each component of the kit can be enclosed within an individual container and all of the various containers can be within a single package, along with instructions for interpreting the results of the assays performed using the kit.

In one aspect, the article of manufacture or kit disclosed herein is used for diagnosing a condition or a disease in a subject, assessing the risk of a subject developing a condition or a disease, and/or evaluating prognosis of a condition or a disease in a subject, for example, following treatment of the subject with a therapy. In one aspect, the article of manufacture is used to assay a sample obtained from a subject having or suspected of having a condition or a disease.

In one aspect, at least one support structure of the cover sheet is located at the center of the cover sheet. In one aspect, the height of the support structure is higher than the height of the boss. In another aspect, the numbers of the through-holes and the bosses are equal or unequal. In one aspect, the through-holes are arranged in a single row or multiple rows on the cover sheet. In another aspect, the through-holes in the same row are arranged in a straight line. In one aspect, the interval of the through-holes in a straight line is equal to the interval of the pipette nozzles of a multi-channel pipette nozzle, or equal to the interval of the pipette nozzles of a multi-channel pipette nozzle multiplied by an integer. In one aspect, a cross-section of the through-hole can be circular, elliptical, oval, square, or rectangular. In another aspect, the surface of the boss can be plane or curved surface. In yet another aspect, the cross-section of the boss can be square, rectangular, an ellipse, or oval. In still other aspects, the support structures can be cylindrical, rectangular, elliptical, or of another shape. In one embodiment, the height of each support structure is equal, such that the base surface of the cover sheet is in the same plane and prevents local surface from deforming. Because of the same height of the support structures, in one aspect, it's easier to find a balance than other shapes of the structures, such as a planar or strip shape. In one aspect, this ensures the reaction room is stable and the precision of the assay is reliable. In one aspect, the height of the support structure is higher than that of the boss by about 0.01 mm to about 10 mm. In some aspects, the height of the support structure is higher than that of the boss by between about 0.01 mm and about 0.05 mm, between about 0.05 mm and about 0.1 mm, between about 0.1 mm and about 0.5 mm, between about 0.5 mm and about 1 mm, between about 1 mm and about 5 mm, between about 5 mm and about 10 mm, or more than about 10 mm.

In another aspect, the cover sheet is made of and/or comprises plastic, glass, silicon, ceramics, or metals, or any combination thereof. In one aspect, the cover sheet and the boss are molded integrally as one piece. In another aspect, the boss and the other parts of the cover sheet are manufactured (e.g., by molding) separately, and then combined. In some embodiments, the parts of a cover sheet are combined and/or connected by gluing, welding, anodic bonding, or ultrasonic welding, or any combination thereof in any suitable order.

In one aspect, the shapes and surface areas of the bosses are in accordance with the positions of the lattice areas (or array areas) on the chip and the positions of the through-holes on the bosses, to ensure that the plurality of reaction units are filled with a reaction solution at the same time, when the reaction solution is added to the reaction units in a batch format using a multi-channel pipette.

In some aspects, the technical solution provided herein has the following advantages:

1. The support structures comprise a number of independent and disconnected support platforms (support columns) distributed on the cover sheet. The height of each support structure is equal to ensure that the base surface of the cover sheet is in the same plane, thus preventing a local surface of the cover sheet from deforming. Because of the same height of the support structures, it's easier to find a balance than other structures, such as a plane- or strip-shaped structure as the support structure. Thus, in one aspect, reaction volumes formed using the same cover sheet is substantially identical within one assay. In another aspect, reaction volumes formed using the same cover sheet at different time points and/or in different assays are substantially identical. In yet another aspect, reaction volumes formed using different cover sheets of the same parameters (e.g., a batch of identical cover sheets) are substantially identical. Accordingly, the present disclosure provides precision of controlling the reaction volumes across samples within the same assay or across samples in different assays, leading to more reliable assay results.

2. In one aspect, the intervals of the through-holes are equal to the intervals of the multi-channel pipette nozzles, or are equal to the intervals of the multi-channel pipette nozzles multiplied by an integer. Thus, adding samples by using a multi-channel pipette can be made with less labor costs and higher efficiency according to the present disclosure.

3. In one aspect, the shapes and surface areas of the bosses correspond to the locations of the lattice areas on the chip and the locations of the through-hole on the cover sheet. Thus, reaction units formed between the chip and the cover sheet are filled with a reaction solution at the same time, and quickly, efficiently, and/or evenly across the reaction units, by using a multi-channel pipette.

4. In one aspect, the intervals of the through-holes can be set discontinuously or continuously to be more flexible for adding samples (e.g., a reaction mixture). For example, there can be one through-hole on each of the bosses on the cover sheet. In another example, there is a through-hole on every other adjacent boss or every three or four adjacent bosses on the cover sheet.

In addition to the above, in one aspect, since the bosses on the cover sheet are separated from each other, and each boss forms a reaction volume with a corresponding array area on the chip, the resultant reaction volumes are also physically separated. For example, the contents of adjacent reaction volumes do not mix, thus avoiding cross-contamination between reactions.

Referring to the figures, FIG. 1 is a view of a structure of a device according to one embodiment of the present disclosure. The microarray reaction device 100 comprises a chip 102 and a cover sheet 104. In one aspect, the cover sheet is used as a part of the microarray reaction device. In another aspect, the cover sheet is integrated with the chip, e.g., a nucleic acid microarray chip, a peptide microarray chip, or a tissue microarray chip. In yet another aspect, the cover sheet is integrated with the chip and forms the main structure of a microarray reaction device. The structures of the cover sheet showing in the figures are not meant to limit the scope of the present disclosure to any particular embodiment. Any structures can be used as long as they are constructed to suit a device according to the present disclosure.

Figure 2:
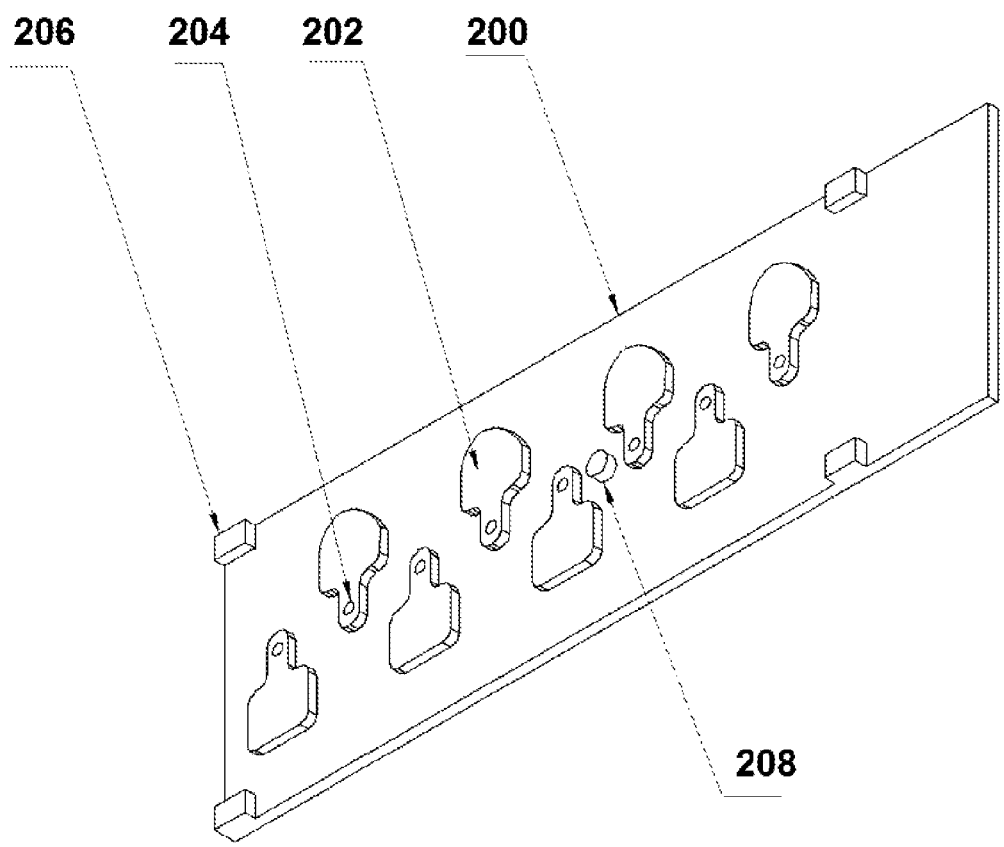
FIG. 2 is a schematic drawing of a cover sheet according to one embodiment of the present disclosure.

FIG. 2 shows a cover sheet according to one embodiment of the present disclosure. In this embodiment, the cover sheet 200 comprises a plurality of reaction units, for example, at least two bosses. As shown in FIG. 2, the cover sheet comprises eight bosses 202. In one aspect, the bosses are on the same side of the cover sheet, to form an upper layer of a reaction room or volume. In one aspect, each boss has a through-hole 204. In one aspect, the through-holes are arranged continuously on the cover sheet. In another aspect, the through-hole has openings on both sides of the cover sheet. In one embodiment, the through-hole is substantially perpendicular to the plane of the cover sheet. In another aspect, the through-hole is used for adding a sample, e.g., a reaction solution, or a plurality of samples or reagents sequentially into a reaction volume. In one aspect, the cover sheet comprises on the same side as the bosses a plurality of support structures. For example, as shown in FIG. 2, four rectangular support platforms 206 are on the same side as the bosses at substantially the four corners of the cover sheet. In one embodiment, the cover sheet further comprises a support structure substantially in the central portion of the cover sheet, for example, the cylinder supporter 208 in FIG. 2. In another embodiment, the bottoms of the support platforms and the cylinder supporter are substantially in the same plane. In one aspect, the cover sheet is supported and/or fixed in position relative to the chip, by the bottoms of the support platforms and the cylinder supporter which are on the sample plane.

In one embodiment, the plurality of bosses are divided and arranged into at least two rows. The rows may have equal or unequal numbers of bosses. For example, as shown in FIG. 2, eight bosses are divided into two rows and arranged on the same side of the cover sheet. Each boss has a through-hole, which is arranged in a line with the through-holes of the other bosses and is thus continuously arranged. In one aspect, the intervals between two adjacent through-holes (for example, the distance between the centers of two adjacent through-holes) are equal or unequal to each other. For example, the interval between two adjacent through-holes can be 9 mm or about 9 mm, which is equal to the interval between two adjacent pipette nozzles of a multi-channel pipette. Thus, reaction samples (e.g., a reaction solution) can be added into the eight reaction units by using an eight-channel pipette, each pipette nozzle of the eight-channel pipette delivering a sample in a through-hole. In one embodiment, the reaction samples are added into the reaction units at substantially the same time.

In particular embodiments, the interval between two adjacent through-holes, e.g., the distance between the centers of two adjacent through-holes, is about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 40 mm, about 41 mm, about 42 mm, about 43 mm, about 44 mm, about 45 mm, about 46 mm, about 47 mm, about 48 mm, about 49 mm, or about 50 mm. In other embodiments, the distance between the centers of two adjacent through-holes is more than about 50 mm, between about 50 mm and about 60 mm, between about 60 mm and about 70 mm, between about 70 mm and about 80 mm, between about 80 mm and about 90 mm, or between about 90 mm and about 100 mm. In still other embodiments, for example, in reaction devices for scaling up production or analysis, the distance between the centers of two adjacent through-holes can be even larger, e.g., about 20 cm, 30 cm, 40 cm, 50 cm, 60 cm, 70 cm, 80 cm, 90 cm, 1 m, 2 m, 3 m, 4 m, 5 m, or larger than about 5 m.

In some embodiments, the interval between two adjacent through-holes is fixed or adjustable. For example, the bosses can be fixed on the cover sheet, or can be movable along the length or width of the cover sheet so that the interval between two adjacent through-holes can be adjusted. It is to be understood that in some aspects, fewer than the total number of through-holes on the cover sheet are used. For example, any one or combination of the eight through-holes shown in FIG. 2 can be used for adding a sample or reagent.

In one embodiment, the surfaces of the bosses are planar, for example in the same plane as shown in FIG. 2. In one aspect, the height (or thickness) of the bosses are equal. In one aspect, the surface area is substantially equal among the bosses. In another aspect, the shapes of the bosses are different. Thus, when an eight-channel pipette is used to add sample, the reaction volumes of the reaction units below the bosses (and between the boss and an array area on the chip) are rapidly filled with the added reaction solution at the same time. In one embodiment, the reaction volumes of the reaction units are substantially identical. In another aspect, the surface areas of the bosses are different. In another aspect, the shapes of the bosses are the same or substantially the same.

In one embodiment, the bottoms of the support platforms and the cylinder supporter are disconnected and dispersed and fixed to the cover sheet. In one aspect, the heights of each support structure are equal, such that the base surface of the cover sheet is in the same plane. In one aspect, the arrangement of the support structures on the cover sheet, including their height, shape, position in the cover sheet, and surface property of the bottom of the support structure, is such that local surface deformation of the cover sheet and/or the chip is prevented. Because of the same height of the support structures, it's easier to balance the cover sheet than other structures such as those in a planar or strip shape, and to ensure that the reaction volume is stable and fixed with a reliable precision and that the reaction solution is evenly or uniformly distributed.

In one aspect, the height of the support platform and the cylinder supporter is higher than the height of the boss surface by about 0.1 mm. Thus, the cover sheet as shown in FIG. 2 and the chip form eight reaction volumes each with a height of about 0.1 mm, at each of the reaction units. In other aspects, the height of the support structure is higher than the height of the boss surface by about 0.1 µm, about 0.5 µm, about 1 µm, about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm. In yet other aspects, the height of the support structure is higher than the height of the boss surface by about 0.1 mm, about 0.2 mm, about 0.3 mm, about 0.4 mm, about 0.5 mm, about 0.6 mm, about 0.7 mm, about 0.8 mm, about 0.9 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0 mm. In yet other aspects, the height of the support structure is higher than the height of the boss surface by between about 0.1 mm and about 0.2 mm, between about 0.2 mm and about 0.3 mm, between about 0.3 mm and about 0.4 mm, between about 0.4 mm and about 0.5 mm, between about 0.5 mm and about 0.6 mm, between about 0.6 mm and about 0.7 mm, between about 0.7 mm and about 0.8 mm, between about 0.8 mm and about 0.9 mm, between about 0.9 mm and about 1.0 mm, between about 1.1 mm and about 1.2 mm, between about 1.2 mm and about 1.3 mm, between about 1.3 mm and about 1.4 mm, between about 1.4 mm and about 1.5 mm, between about 1.5 mm and about 1.6 mm, between about 1.6 mm and about 1.7 mm, between about 1.7 mm and about 1.8 mm, between about 1.8 mm and about 1.9 mm, or between about 1.9 mm and about 2.0 mm. In other aspects, the height of the support structure is higher than the height of the boss surface by more than about 2.0 mm.

In one aspect, the material of the cover sheet is PC plastic. In another aspect, the cover sheet is manufactured in one piece, for example, by injection molding of plastic.

Figure 3:
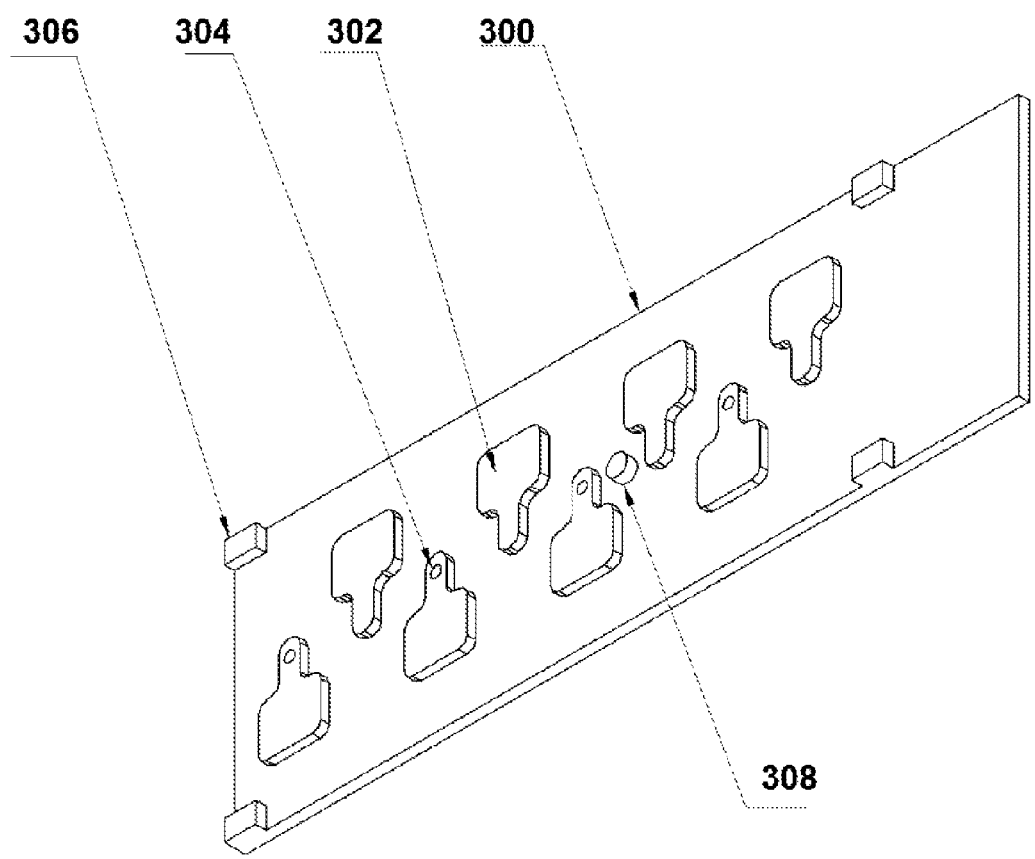
FIG. 3 is a schematic drawing of a cover sheet according to one embodiment of the present disclosure.

Turning to FIG. 3, there is shown a cover sheet according to one embodiment of the present disclosure. In this embodiment, the cover sheet 300 comprises eight bosses 302. Compared to FIG. 2, the present embodiment has four through-holes. In one aspect, there is provided a through-hole in every other adjacent boss. In another aspect, there is a boss without a through-hole between two bosses with through-holes.

In one aspect, the bosses are on the same side of the cover sheet, to form an upper layer of a reaction room or volume. In one aspect, every other adjacent boss has a through-hole 304, which has openings on both sides of the cover sheet. In one embodiment, the through-hole is substantially perpendicular to the plane of the cover sheet and/or the place of the surface of the boss. In another aspect, the through-hole is used for adding a sample, e.g., a reaction solution, or a plurality of samples sequentially into a reaction volume. In one aspect, the cover sheet comprises on the same side as the bosses a plurality of support structures. For example, as shown in FIG. 3, four rectangular support platforms 306 are on the same side as the bosses at substantially the four corners of the cover sheet. In one embodiment, the cover sheet further comprises a support structure substantially in the central portion of the cover sheet, for example, the cylinder supporter 308 in FIG. 3. In another embodiment, the bottoms of the support platforms and the cylinder supporter are substantially in the same plane. In one aspect, the cover sheet is supported and/or fixed in position relative to the chip, by the bottoms of the support platforms and the cylinder supporter which are on the sample plane.

In one embodiment, the plurality of bosses are divided and arranged into at least two rows. The rows may have equal or unequal numbers of bosses. For example as shown in FIG. 3, eight bosses are divided into two rows and arranged on the same side of the cover sheet. Each boss in one of the rows has a through-hole, which is arranged in a line with the through-holes of the other bosses, while the bosses in the other row do not have through-holes. Thus, the through-holes are arranged discontinuously. In one aspect, the intervals between two adjacent through-holes (for example, the distance between the centers of two adjacent through-holes) are equal to each other. For example, the interval between two adjacent through-holes is about 18 mm, which is equal to twice the interval between two adjacent pipette nozzles of a multi-channel pipette. Thus, reaction samples (e.g., reaction solution) can be added into the four reaction units by using the multi-channel pipette. In one embodiment, the reaction samples are added into the reaction units at substantially the same time.

In particular embodiments, the interval between two adjacent through-holes, e.g., the distance between the centers of two adjacent through-holes, is about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 40 mm, about 41 mm, about 42 mm, about 43 mm, about 44 mm, about 45 mm, about 46 mm, about 47 mm, about 48 mm, about 49 mm, or about 50 mm. In other embodiments, the distance between the centers of two adjacent through-holes is more than about 50 mm, between about 50 mm and about 60 mm, between about 60 mm and about 70 mm, between about 70 mm and about 80 mm, between about 80 mm and about 90 mm, or between about 90 mm and about 100 mm. In still other embodiments, for example, in reaction devices for scaling up production or analysis, the distance between the centers of two adjacent through-holes can be even larger, e.g., about 20 cm, 30 cm, 40 cm, 50 cm, 60 cm, 70 cm, 80 cm, 90 cm, 1 m, 2 m, 3 m, 4 m, 5 m, or larger than about 5 m. In some embodiments, the interval between two adjacent through-holes is fixed or adjustable. For example, the bosses can be fixed on the cover sheet, or can be movable along the cover sheet so that the interval between two adjacent through-holes can be adjusted. It is to be understood that in some aspects, fewer than the total number of through-holes on the cover sheet are used. For example, any one or combination of the four through-holes shown in FIG. 3 can be used.

In one embodiment, the surfaces of the bosses are planar, for example in the same plane as shown in FIG. 3. In one aspect, the height (or thickness) of the bosses are equal. In one aspect, the surface area is substantially equal among the bosses. In another aspect, the shapes of the bosses are the same. In another aspect, the shapes of the surface areas of the bosses are the same. When a multi-channel pipette is used to add samples, the reaction volumes of the four reaction units below the bosses with through-holes are rapidly filled with the added reaction solution at the same time. In one embodiment, the reaction volumes of the reaction units are substantially identical. In another aspect, the shapes of the bosses or the surface areas of the bosses are different.

In one embodiment, the bottoms of the support platforms and the cylinder supporter are disconnected and dispersed and fixed to the cover sheet. In one aspect, the heights of each support structure are equal, such that the base surface of the cover sheet is in the same plane, for example, when placed on a flat surface. In one aspect, the arrangement of the support structures on the cover sheet, including their height, shape, position in the cover sheet, and surface property of the bottom surface of the support structure, is such that local surface deformation of the cover sheet and/or the chip is prevented. Because of the same height of the support structures, it's easier to balance the cover sheet than other structures such as those in a planar or strip shape, and to ensure that the reaction volume is stable and fixed with a reliable precision and that the reaction solution is evenly or uniformly distributed.

In one aspect, the height of the support platform and the cylinder supporter is higher than the height of the boss surface by about 0.3 mm. Thus, the cover sheet as shown in FIG. 3 and the chip form eight reaction volumes each with a height of about 0.3 mm, at each of the reaction units. In other aspects, the height of the support structure is higher than the height of the boss surface by about 0.1 µm, about 0.5 µm, about 1 µm, about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm. In yet other aspects, the height of the support structure is higher than the height of the boss surface by about 0.1 mm, about 0.2 mm, about 0.3 mm, about 0.4 mm, about 0.5 mm, about 0.6 mm, about 0.7 mm, about 0.8 mm, about 0.9 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0 mm. In yet other aspects, the height of the support structure is higher than the height of the boss surface by between about 0.1 mm and about 0.2 mm, between about 0.2 mm and about 0.3 mm, between about 0.3 mm and about 0.4 mm, between about 0.4 mm and about 0.5 mm, between about 0.5 mm and about 0.6 mm, between about 0.6 mm and about 0.7 mm, between about 0.7 mm and about 0.8 mm, between about 0.8 mm and about 0.9 mm, between about 0.9 mm and about 1.0 mm, between about 1.1 mm and about 1.2 mm, between about 1.2 mm and about 1.3 mm, between about 1.3 mm and about 1.4 mm, between about 1.4 mm and about 1.5 mm, between about 1.5 mm and about 1.6 mm, between about 1.6 mm and about 1.7 mm, between about 1.7 mm and about 1.8 mm, between about 1.8 mm and about 1.9 mm, or between about 1.9 mm and about 2.0 mm. In other aspects, the height of the support structure is higher than the height of the boss surface by more than about 2.0 mm.

In one aspect, the material of the cover sheet is glass. In another aspect, components of the cover sheet are manufactured separately, and then glued or otherwise connected together to form the cover sheet.

Figure 4:
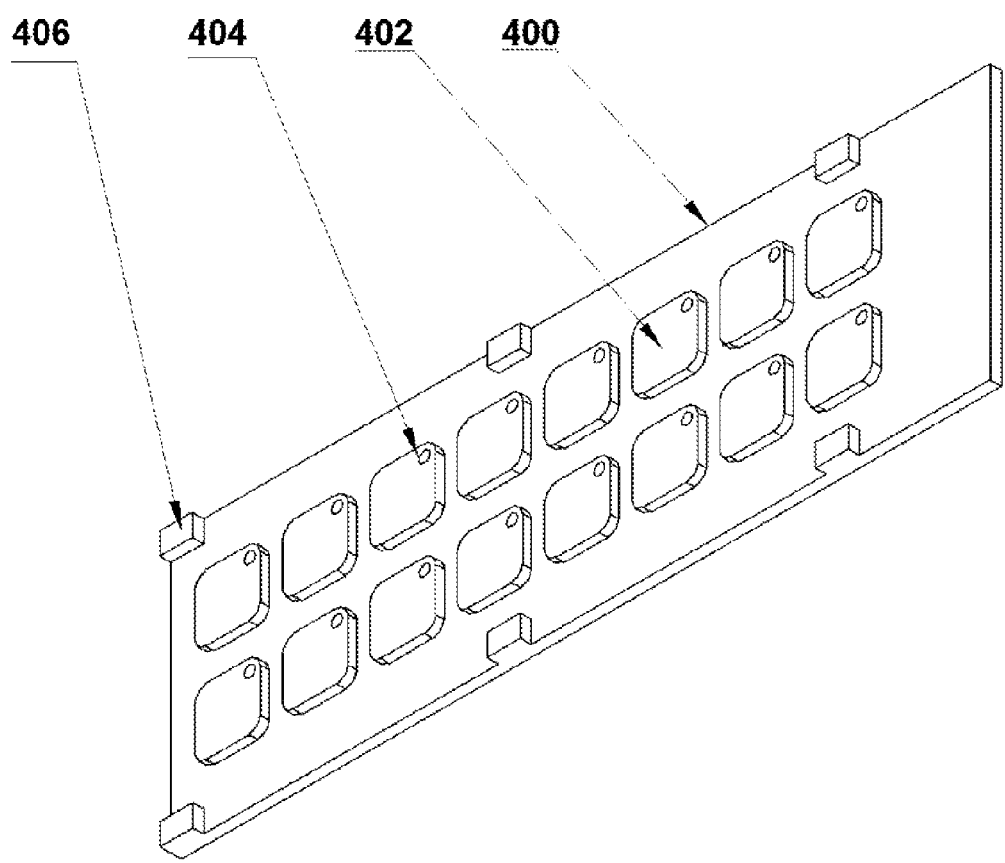
FIG. 4 is a schematic drawing of a cover sheet according to one embodiment of the present disclosure.

FIG. 4 shows a cover sheet according to one embodiment of the present disclosure. In this embodiment, the cover sheet 400 comprises a plurality of reaction units, for example, sixteen bosses 402 as shown in FIG. 4. In one aspect, the bosses are on the same side of the cover sheet, to form an upper layer of a reaction room or volume. In one aspect, each boss has a through-hole 404, which has openings on both sides of the cover sheet. In one embodiment, the through-hole is substantially perpendicular to the plane of the cover sheet and/or the place of the surface of the boss. In one aspect, each boss has a through-hole which is arranged continuously in a line on the cover sheet.

In another aspect, the through-hole is used for adding a sample, e.g., a reaction solution, or a plurality of samples sequentially into a reaction volume. In one aspect, the cover sheet comprises on the same side as the bosses a plurality of support structures. For example, as shown in FIG. 4, six rectangular support platforms 406 are on the same side as the bosses. Four of the six support platforms are substantially at the four corners of the cover sheet. In one aspect, the other two support platforms are substantially at the middle edge of the cover sheet. In one embodiment, the cover sheet further comprises a support structure substantially in the central portion of the cover sheet. In another embodiment, the bottom surfaces of the support platforms are substantially in the same plane. In one aspect, the cover sheet is supported and/or fixed in position relative to the chip, by the bottom surfaces of the support platforms and/or support structure which are on the sample plane.

In one embodiment, the plurality of bosses are divided and arranged into at least two rows. The rows may have equal or unequal numbers of bosses. For example as shown in FIG. 4, sixteen bosses are divided into two rows and arranged on the same side of the cover sheet. Each boss has a through-hole, and the through-holes are arranged in two lines. In one aspect, the intervals between two adjacent through-holes in each of the two lines (for example, the distance between the centers of two adjacent through-holes) are equal to each other. For example, the interval between two adjacent through-holes is about 9 mm, which is equal to the interval between two adjacent pipette nozzles of a multi-channel pipette. Thus, reaction samples (e.g., reaction solution) can be added into the sixteen reaction units, eight at a time, by using the multi-channel pipette. In one embodiment, the reaction samples are added into the eight reaction units in each of the two lines at the same time.

In particular embodiments, the interval between two adjacent through-holes in each of the two lines, e.g., the distance between the centers of two adjacent through-holes in each of the two lines, is about 1 mm, about 2 mm, about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, about 25 mm, about 26 mm, about 27 mm, about 28 mm, about 29 mm, about 30 mm, about 40 mm, about 41 mm, about 42 mm, about 43 mm, about 44 mm, about 45 mm, about 46 mm, about 47 mm, about 48 mm, about 49 mm, or about 50 mm. In other embodiments, the distance between the centers of two adjacent through-holes in each of the two lines is more than about 50 mm, between about 50 mm and about 60 mm, between about 60 mm and about 70 mm, between about 70 mm and about 80 mm, between about 80 mm and about 90 mm, or between about 90 mm and about 100 mm. In still other embodiments, for example, in reaction devices for scaling up production or analysis, the distance between the centers of two adjacent through-holes can be even larger, e.g., about 20 cm, 30 cm, 40 cm, 50 cm, 60 cm, 70 cm, 80 cm, 90 cm, 1 m, 2 m, 3 m, 4 m, 5 m, or even larger than about 5 m. In some embodiments, the interval between two adjacent through-holes is fixed or adjustable. For example, the bosses can be fixed on the cover sheet, or can be movable along the cover sheet so that the interval between two adjacent through-holes can be adjusted. It is to be understood that in some aspects, fewer than the total number of through-holes on the cover sheet are used. For example, any one or combination of the sixteen through-holes shown in FIG. 4 can be used.

In one embodiment, the surfaces of the bosses are planar and are one the same plane, for example, as shown in FIG. 4. In one aspect, the height (or thickness) of the bosses are equal. In one aspect, the surface area is substantially equal among the bosses. In another aspect, the shapes of the bosses are the same. In another aspect, the shapes of the surface areas of the bosses are the same. When a multi-channel pipette is used to add samples, the reaction volumes of the four reaction units below the bosses with through-holes are rapidly filled with the added reaction solution at the same time. In another aspect, the shapes of the bosses or the surface areas of the bosses are different.

In one embodiment, as shown in FIG. 4, the bottoms of the six support platforms are disconnected and dispersed and fixed to the cover sheet. In one aspect, the heights of each support structure are equal, such that the base surface of the cover sheet is in the same plane, for example, when placed on a flat surface. In one aspect, the arrangement of the support structures on the cover sheet, including their height, shape, position in the cover sheet, and surface property of the bottom surface of the support structure, is such that local surface deformation of the cover sheet and/or the chip is prevented. Because of the same height of the support structures, it's easier to balance the cover sheet than other structures such as those in a planar or strip shape, and to ensure that the reaction volume is stable and fixed with a reliable precision and that the reaction solution is evenly or uniformly distributed.

In one aspect, the height of the support platform is higher than the height of the boss surface by about 0.08 mm. Thus, the cover sheet as shown in FIG. 4 and the chip form sixteen reaction volumes each with a height of about 0.08 mm, at each of the reaction units. In other aspects, the height of the support structure is higher than the height of the boss surface by about 0.1 µm, about 0.5 µm, about 1 µm, about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm. In yet other aspects, the height of the support structure is higher than the height of the boss surface by about 0.1 mm, about 0.2 mm, about 0.3 mm, about 0.4 mm, about 0.5 mm, about 0.6 mm, about 0.7 mm, about 0.8 mm, about 0.9 mm, about 1.1 mm, about 1.2 mm, about 1.3 mm, about 1.4 mm, about 1.5 mm, about 1.6 mm, about 1.7 mm, about 1.8 mm, about 1.9 mm, or about 2.0 mm. In yet other aspects, the height of the support structure is higher than the height of the boss surface by between about 0.1 mm and about 0.2 mm, between about 0.2 mm and about 0.3 mm, between about 0.3 mm and about 0.4 mm, between about 0.4 mm and about 0.5 mm, between about 0.5 mm and about 0.6 mm, between about 0.6 mm and about 0.7 mm, between about 0.7 mm and about 0.8 mm, between about 0.8 mm and about 0.9 mm, between about 0.9 mm and about 1.0 mm, between about 1.1 mm and about 1.2 mm, between about 1.2 mm and about 1.3 mm, between about 1.3 mm and about 1.4 mm, between about 1.4 mm and about 1.5 mm, between about 1.5 mm and about 1.6 mm, between about 1.6 mm and about 1.7 mm, between about 1.7 mm and about 1.8 mm, between about 1.8 mm and about 1.9 mm, or between about 1.9 mm and about 2.0 mm. In other aspects, the height of the support structure is higher than the height of the boss surface by more than about 2.0 mm.

In one aspect, the material of the cover sheet is PMMA. In another aspect, the cover sheet is manufactured by ultrasonic welding molding.

Use of Cover Sheets and Microarray Reaction Devices

The present microarray reaction device and cover sheet can be used in any suitable assay to improve assay precision, reproducibility, and/or sensitivity, particularly for the assays involving small reaction volumes. For instance, the microarray reaction device or cover sheet can be used in assaying the interaction between various moieties, e.g., nucleic acids, immunoreactions involving proteins, interactions between a protein and a nucleic acid, a ligand-receptor interaction, and small molecule and protein or nucleic acid interactions, etc.

The present cover sheets, devices, methods and kits can be used to assay any analyte, e.g., a cell, a cellular organelle, a virus, a molecule and an aggregate or complex thereof. Exemplary cells include animal cells, plant cells, fungus cells, bacterium cells, recombinant cells and cultured cells. Animal, plant, fungus, bacterium cells can be derived from any genus or subgenus of the Animalia, Plantae, fungus or bacterium kingdom. Cells derived from any genus or subgenus of ciliates, cellular slime molds, flagellates and microsporidia can also be assayed by the present methods. Cells derived from birds such as chickens, vertebrates such as fish and mammals such as mice, rats, rabbits, cats, dogs, pigs, cows, ox, sheep, goats, horses, monkeys and other non-human primates, and humans can be assayed by the present methods.

For animal cells, cells derived from a particular tissue or organ can be assayed by the present cover sheets, devices, methods and kits. For example, connective, epithelium, muscle or nerve tissue cells can be assayed. Similarly, cells derived from an internal animal organ such as brain, lung, liver, spleen, bone marrow, thymus, heart, lymph, blood, bone, cartilage, pancreas, kidney, gall bladder, stomach, intestine, testis, ovary, uterus, rectum, nervous system, gland, internal blood vessels, etc. can be assayed. Further, cells derived from any plants, fungi such as yeasts, bacteria such as eubacteria or archaebacteria can be assayed. Recombinant cells derived from any eucaryotic or prokaryotic sources such as animal, plant, fungus or bacterium cells can also be assayed. Body fluid such as blood, urine, saliva, bone marrow, sperm or other ascitic fluids, and subfractions thereof, e.g., serum or plasma, can also be assayed.

Exemplary cellular organelles include nuclei, mitochondria, chloroplasts, ribosomes, ERs, Golgi apparatuses, lysosomes, proteasomes, secretory vesicles, vacuoles and microsomes. Exemplary molecules include inorganic molecules, organic molecules and a complex thereof. Exemplary organic molecules include amino acids, peptides, proteins, nucleosides, nucleotides, oligonucleotides, nucleic acids, vitamins, monosaccharides, oligosaccharides, carbohydrates, lipids and a complex thereof.

Any amino acids can be assayed by the present cover sheets, devices, methods and kits. For example, a D- and a L-amino-acid can be assayed. Any proteins or peptides can be assayed by the present cover sheets, devices, methods and kits. For example, enzymes, transport proteins such as ion channels and pumps, nutrient or storage proteins, contractile or motile proteins such as actins and myosins, structural proteins, defense protein or regulatory proteins such as antibodies, hormones and growth factors can be assayed. Proteineous or peptidic antigens can also be assayed.

Any nucleosides can be assayed by the present cover sheets, devices, methods and kits. Examples of such nucleosides include adenosine, guanosine, cytidine, thymidine and uridine. Any nucleotides can be assayed according to the present disclosure. Examples of such nucleotides include AMP, GMP, CMP, UMP, ADP, GDP, CDP, UDP, ATP, GTP, CTP, UTP, dAMP, dGMP, dCMP, dTMP, dADP, dGDP, dCDP, dTDP, dATP, dGTP, dCTP and dTTP. Any nucleic acids, including single-, double and triple-stranded nucleic acids, can be assayed by the present cover sheets, devices, methods and kits. Examples of such nucleic acids include DNA, such as A-, B- or Z-form DNA, and RNA such as mRNA, miRNA, piRNA, tRNA and rRNA.

Any vitamins can be assayed by the present cover sheets, devices, methods and kits. For example, water-soluble vitamins such as thiamine, riboflavin, nicotinic acid, pantothenic acid, pyridoxine, biotin, folate, vitamin $B_{12}$ and ascorbic acid can be assayed. Similarly, fat-soluble vitamins such as vitamin A, vitamin D, vitamin E, and vitamin K can be assayed.

Any monosaccharides, whether D- or L-monosaccharides and whether aldoses or ketoses, can be assayed the present cover sheets, devices, methods and kits. Examples of monosaccharides include triose such as glyceraldehyde, tetroses such as erythrose and threose, pentoses such as ribose, arabinose, xylose, lyxose and ribulose, hexoses such as allose, altrose, glucose, mannose, gulose, idose, galactose, talose and fructose and heptose such as sedoheptulose.

Any lipids can be assayed by the present cover sheets, devices, methods and kits. Examples of lipids include triacylglycerols such as tristearin, tripalmitin and triolein, waxes, phosphoglycerides such as phosphatidylethanolamine, phosphatidylcholine, phosphatidylserine, phosphatidylinositol and cardiolipin, sphingolipids such as sphingomyelin, cerebrosides and gangliosides, sterols such as cholesterol and stigmasterol and sterol fatty acid esters. The fatty acids can be saturated fatty acids such as lauric acid, myristic acid, palmitic acid, stearic acid, arachidic acid and lignoceric acid, or can be unsaturated fatty acids such as palmitoleic acid, oleic acid, linoleic acid, linolenic acid and arachidonic acid.

The present cover sheets, devices, methods and kits can be used to assay any sample. For example, the present method can be used to assay a mammalian sample. Exemplary mammals include bovines, goats, sheep, equines, rabbits, guinea pigs, murine, humans, felines, monkeys, dogs and porcines. The present cover sheets, devices, methods and kits can also be used to assay a clinical sample. Exemplary clinical samples include serum, plasma, whole blood, sputum, cerebral spinal fluid, amniotic fluid, urine, gastrointestinal contents, hair, saliva, sweat, gum scrapings and tissue from biopsies. Preferably, the present cover sheets, devices, methods and kits are used to assay a human clinical sample.

Any suitable reagents can be used in an assay according to the present disclosure. In one aspect, the reagents used in the present disclosure bind or interact specifically with an analyte in a sample. Exemplary reagents include cells, cellular organelles, viruses, molecules and an aggregate or complex thereof. In one aspect, the reagent is an antibody, or a nucleic acid.

The present cover sheets, devices, methods and kits can be used in any suitable assay format, for example, in a direct assay format, a sandwich assay format or a competition assay format. In one embodiment, a different plurality of reagents are used to assay a single analyte. In another embodiment, a different plurality of reagents are used to assay a different plurality of analytes. In still another embodiment, a plurality of reagents are attached to the plurality of bosses of the cover sheet, and is used, for example, to assay one or more analytes in one or more samples.

The present cover sheets, devices, methods and kits can be used to detect any interaction(s) among moieties selected from the group consisting of a cell, a cellular organelle, a virus, a molecule and an aggregate or complex thereof. For example, interactions between or among macromolecules, such as DNA-DNA, DNA-RNA, RNA-RNA, DNA-protein, RNA-protein and protein-protein, etc., interactions can be analyzed. In other embodiments, macromolecule-small molecule or small molecule-small molecule interactions are detected or analyze using the present device or cover sheet. More complex interactions including interactions among more than two moieties can also be detected and/or analyzed according to the present disclosure. When DNA-DNA, DNA-RNA, RNA-RNA interactions are to be detected, the contacting, i.e., hybridizing, step, can be conducted under suitable condition, e.g., under low, middle or high stringency, after samples or reagents are delivered to the reaction volumes according to the present disclosure.

The interaction between a test moiety and a plurality of target moieties can be detected by any suitable methods, and the present device or cover sheet can be made to suit the particular detection method. For example, the test moiety and/or target moieties can be labeled to facilitate detection. Any suitable label can be used. Exemplary labels include a radioactive, a fluorescent, a chemical, an enzymatic, a luminescent and a FRET (fluorescence resonance energy transfer) label. The luminescent label can be a chemiluminescent label or a bioluminescent label. The labels can be attached or conjugated, directly or indirectly, to the test moiety alone, the target moiety alone, or on both. The read-out can be a positive or a negative signal. Any suitable assay formats, including sandwich or competitive formats, can be used. Any of the samples or reagents, including the labels, primers or dNTPs of a PCR reaction, or an enzyme, can be delivered using the present microarray reaction device or cover sheet.

In one embodiment, the present microarray reaction device or cover sheet is used to detect interaction between or among a test moiety and a plurality of genes, gene fragments or their encoded products. For instance, the plurality of target genes, gene fragments or their encoded products are involved in a biological pathway, belong to a group of proteins with identical or similar biological function, expressed in a stage of cell cycle, expressed in a cell type, expressed in a tissue type, expressed in an organ type, expressed in a developmental stage, proteins whose expression and/or activity is altered in a disease or disorder type or stage, or proteins whose expression and/or activity is altered by drug or other treatments.

The present microarray reaction device or cover sheet can be used in detecting interaction between or among a single test moiety or substance and a plurality of target moieties. Preferably, the present methods are used in high-throughput mode, e.g., in detecting a plurality of target moieties, and/or interaction between or among a plurality of test moieties or substances. The interaction between a plurality of test moieties or substances and a plurality of target moieties can be detected simultaneously or sequentially.

The following examples are intended to further describe and illustrate various aspects of the present disclosure, but not to limit, the scope of the present disclosure in any manner, shape, or form, either explicitly or implicitly.

The present disclosure is further illustrated by the following exemplary embodiments:

1. A microarray reaction device, comprising:
   a chip provided with one or more latticed areas;
   a cover sheet provided with one or more bosses, wherein the cover sheet is capable of combining with the chip to form a reaction room between the latticed area and the boss;
   one or more through-holes on the one or more bosses, wherein each through-hole extends to the other side of the cover sheet; and
   at least three support structures,
   wherein the support structures and the one or more bosses are on the same side of the cover sheet.

2. The microarray reaction device of embodiment 1, wherein at least one of the support structures is located at the center of the cover sheet, and wherein the height of the support structure is higher than that of the boss.

3. The microarray reaction device of embodiment 1 or embodiment 2, wherein the number of through-holes and the number of bosses are equal or unequal, and wherein the through-holes arranged in a straight line are arranged in a single row or multiple rows.

4. The microarray reaction device of embodiment 3, wherein the interval of the through-holes in a straight line is equal to the interval of the nozzles of a multi-channel pipette, or is equal to multiple intervals of the nozzles of a multi-channel pipette.

5. The microarray reaction device of any one of embodiments 1-4, wherein the cross-section(s) of the through-holes are circular, elliptical, oval, square, rectangular, or of an irregular shape, wherein the surface(s) of the one or more bosses are plane or curved surfaces, and wherein the cross-section(s) of the one or more bosses are square, rectangular, circular, elliptical, oval, or of an irregular shape.

6. The microarray reaction device of any one of embodiments 1-5, wherein the shapes of the support structures are cylindrical, rectangular, elliptical, of another shape, or of an irregular shape.

7. The microarray reaction device of any one of embodiments 1-6, wherein the heights of the support structures are equal.

8. The microarray reaction device of any one of embodiments 1-7, wherein the height of the support structure is higher than the height of the boss by about 0.01 mm to about 10 mm.

9. The microarray reaction device of any one of embodiments 1-8, wherein the material of the cover sheet is plastic, glass, silicon, ceramics, or at least one kind of metal.

10. The microarray reaction device of any one of embodiments 1-9, wherein the cover sheet and the boss are integrally molded or separately molded.

11. A microarray reaction device, comprising:
a microarray chip comprising one or more array areas; and
a cover sheet, comprising: (1) one or more bosses, each boss corresponding to an array area on the microarray chip; (2) one or more through-holes on at least one of the bosses, wherein the through-holes extend from one side of the cover sheet to the other side; and (3) at least two support structures,
wherein the support structures and the one or more bosses are on the same side of the cover sheet.

12. The microarray reaction device of embodiment 11, wherein the cover sheet is capable of combining with the microarray chip to form a reaction volume between each boss and the corresponding array area.

13. The microarray reaction device of embodiment 11 or embodiment 12, wherein the cover sheet comprises at least three support structures.

14. The microarray reaction device of any one of embodiments 11-13, wherein at least one of the support structures is located substantially at the center of the cover sheet.

15. The microarray reaction device of any one of embodiments 11-14, wherein at least one of the support structures is located substantially at a corner of the cover sheet.

16. The microarray reaction device of any one of embodiments 11-15, wherein the height of the support structure is higher than that of the boss.

17. The microarray reaction device of any one of embodiments 11-16, wherein the number of through-holes and the number of bosses are equal or unequal.

18. The microarray reaction device of any one of embodiments 11-17, wherein the through-holes are arranged in a straight line.

19. The microarray reaction device of any one of embodiments 11-18, wherein the through-holes are arranged in a single row or multiple rows.

20. The microarray reaction device of any one of embodiments 11-19, wherein the distance between two adjacent through-holes is equal to the distance between two adjacent nozzles of a multi-channel pipette, or is equal to the distance between two adjacent nozzles of a multi-channel pipette multiplied by an integer.

21. The microarray reaction device of any one of embodiments 11-20, wherein the cross-section(s) of the one or more through-holes are circular, elliptical, oval, square, rectangular, or of an irregular shape.

22. The microarray reaction device of any one of embodiments 11-21, wherein the surface(s) of the one or more bosses are plane or curved surfaces.

23. The microarray reaction device of any one of embodiments 11-22, wherein the cross-section(s) of the one or more bosses are square, rectangular, circular, elliptical, oval, or of an irregular shape.

24. The microarray reaction device of any one of embodiments 11-23, wherein the shapes of the support structures are cylindrical, rectangular, elliptical, of another shape, or of an irregular shape.

25. The microarray reaction device of any one of embodiments 11-24, wherein the heights of the support structures are equal among the support structures.

26. The microarray reaction device of any one of embodiments 11-25, wherein the height of the support structure is higher than the height of the boss by about 0.01 mm to about 10 mm.

27. The microarray reaction device of any one of embodiments 11-26, wherein the material of the cover sheet comprises plastic, glass, silicon, ceramics, or at least one kind of metal.

28. The microarray reaction device of any one of embodiments 11-27, wherein the cover sheet and the boss are integrally molded or separately molded.

29. A cover sheet comprising one or more bosses and at least two support structures on the same side of the cover sheet, wherein at least one boss comprises one or more through-holes extending from one side of the cover sheet to the other side.

30. The cover sheet of embodiment 29, which is for delivering a sample or reagent to a reaction volume.

31. The cover sheet of embodiment 30, wherein the sample or reagent is added to the reaction volume through the one or more through-holes.

32. The cover sheet of any of embodiments 29-31, which is capable of combining with an assay plate to form a reaction volume between each boss and the assay plate.

33. The cover sheet of any of embodiments 29-32, wherein the cover sheet comprises at least three support structures.

34. The cover sheet of embodiment 33, wherein at least one of the support structures is located substantially at the center of the cover sheet.

35. The cover sheet of embodiment 33, wherein at least one of the support structures is located substantially at a corner of the cover sheet.

36. The cover sheet of any of embodiments 33-35, wherein the height of the support structure is higher than that of the boss.

37. The cover sheet of any of embodiments 29-36, wherein the number of through-holes and the number of bosses are equal or unequal.

38. The cover sheet of any of embodiments 29-37, wherein the through-holes are arranged in a straight line.

39. The cover sheet of any of embodiments 29-38, wherein the through-holes are arranged in a single row or multiple rows.

40. The cover sheet of any of embodiments 29-39, wherein the distance between two adjacent through-holes is equal to the distance between two adjacent nozzles of a multi-channel pipette, or is equal to the distance between two adjacent nozzles of a multi-channel pipette multiplied by an integer.

41. The cover sheet of any of embodiments 29-40, wherein the cross-section(s) of the one or more through-holes are circular, elliptical, oval, square, rectangular, or of an irregular shape.

42. The cover sheet of any of embodiments 29-41, wherein the surface(s) of the one or more bosses are plane or curved surfaces.

43. The cover sheet of any of embodiments 29-42, wherein the cross-section(s) of the one or more bosses are square, rectangular, circular, elliptical, oval, or of an irregular shape.

44. The cover sheet of any of embodiments 33-43, wherein the shapes of the support structures are cylindrical, rectangular, elliptical, of another shape, or of an irregular shape.

45. The cover sheet of any of embodiments 33-44, wherein the heights of the support structures are equal among the support structures.

46. The cover sheet of any of embodiments 33-45, wherein the height of the support structure is higher than the height of the boss by about 0.01 mm to about 10 mm.

47. The cover sheet of any of embodiments 29-46, wherein the material of the cover sheet comprises plastic, glass, silicon, ceramics, or at least one kind of metal.

48. The cover sheet of any of embodiments 29-47, wherein the cover sheet and the boss are integrally molded or separately molded.

49. An assay device, comprising:
an assay plate; and
the cover sheet of any of embodiments 29-48,
wherein a reaction volume is formed between each of the bosses and the assay plate.

50. A method for conducting an assay, comprising:
providing the microarray reaction device of any of embodiments 1-28;
delivering a sample to the reaction room or reaction volume;
allowing a reaction of the assay to occur in the reaction room or reaction volume; and
assessing the assay result.

51. A method for conducting an assay, comprising:
providing the assay device of embodiment 49;
delivering a sample to the reaction volume;
allowing a reaction of the assay to occur in the reaction volume; and
assessing the assay result.

52. An article of manufacture, comprising:
a packaging material; and
the microarray reaction device of any of embodiments 1-28, the cover sheet of any of embodiments 29-48, or the assay device of embodiment 49.

53. The article of manufacture of embodiment 52, further comprising a label and/or an instruction.

54. A kit comprising the microarray reaction device of any of embodiments 1-28, the cover sheet of any of embodiments 29-48, or the assay device of embodiment 49, or the article of manufacture of embodiment 52 or 53.

55. The kit of embodiment 54, further comprising one or more reagents for performing an assay.

56. The kit of embodiment 54 or 55, further comprising a reference sample for performing the assay.

57. The kit of any of embodiments 54-56, further comprising an instruction for interpreting a result of the assay performed using the kit.

58. A microarray reaction device comprising following components:
chip: the chip is provided with several latticed areas;
a cover sheet: the cover sheet is provided with several bosses, when cover sheet combine with a chip, reaction room is formed between lattice area and boss;
several through-holes: each cover sheet has a through-hole and the through-hole extend to the other side of the cover sheet; and
at least three support structures: the support structures and boss are on the same side of cover sheet.

59. The microarray reaction device as defined as in embodiment 58, wherein at least one support structure mentioned above is located at the center of the cover sheet; the height of support structure is higher than boss.

60. The microarray reaction device as defined as in embodiments 58 and/or 59, wherein the number of through-hole and boss is equal or unequal; the through-holes arranged in a straight line are arranged in a single row or multiple rows.

61. The microarray reaction device as defined as in embodiment 60, wherein the interval of the through-hole in a straight line is equal or multiple intervals of multi-channel pipette nozzle.

62. The microarray reaction device as defined as in embodiments 58 and/or 59, wherein the cross-section of through-holes are circular, elliptical, oval, square or rectangular; the surface of the bosses are plane or curved surface; the cross-section of the bosses are square, rectangular, ellipse or oval.

63. The microarray reaction device as defined as in embodiments 58 and/or 59, wherein the shapes of support structures are cylindrical, rectangular, elliptical or other shapes.

64. The microarray reaction device as defined as in embodiments 58 and/or 59, wherein the height of the support structures is equal.

65. The microarray reaction device as defined as in embodiments 58 and/or 59, wherein the height of support structure is higher than the height of the boss 0.01 mm-10 mm.

66. The microarray reaction device as defined as in embodiments 58 and/or 59, wherein the material of cover sheet is plastic, glass, silicon, ceramics or at least a kind of metal.

67. The microarray reaction device as defined as in embodiments 58 and/or 59, wherein the cover sheet and boss are integrally molded.

68. The microarray reaction device as defined as in embodiments 58 and/or 59, wherein the cover sheet and boss are separately molded.

The invention claimed is:

1. A microarray reaction device, comprising:
a microarray chip comprising one or more array areas; and
a cover sheet, comprising:
(1) one or more bosses, each boss corresponding to an array area on the microarray chip;
(2) one or more through-holes on at least one of the bosses, wherein the one or more through-holes extend from one side of the cover sheet to the other side; and
(3) at least two support structures, wherein at least one of the support structures is located substantially at the center of the cover sheet,
wherein the support structures and the one or more bosses are on the same side of the cover sheet.

2. The microarray reaction device of claim 1, wherein the cover sheet is capable of combining with the microarray chip to form a reaction volume between each boss and the corresponding array area.

3. The microarray reaction device of claim 1, wherein the cover sheet comprises at least three support structures.

4. The microarray reaction device of claim 1, wherein at least one of the support structures is located substantially at a corner of the cover sheet.

5. The microarray reaction device of claim 1, wherein the height of the support structure is higher than that of the boss.

6. The microarray reaction device of claim 1, wherein the number of through-holes and the number of bosses are equal.

7. The microarray reaction device of claim 1, wherein the through-holes are arranged in a straight line.

8. The microarray reaction device of claim 1, wherein the distance between two adjacent through-holes is equal to the distance between two adjacent nozzles of a multi-channel pipette, or is equal to the distance between two adjacent nozzles of a multi-channel pipette multiplied by an integer.

9. The microarray reaction device of claim 1, wherein the cross-section(s) of the one or more through-holes are circular, elliptical, oval, square, rectangular, or of an irregular shape.

10. The microarray reaction device of claim 1, wherein the surface(s) of the one or more bosses are plane or curved surfaces.

11. The microarray reaction device of claim 1, wherein the cross-section(s) of the one or more bosses are square, rectangular, circular, elliptical, oval, or of an irregular shape.

12. The microarray reaction device of claim 1, wherein the shapes of the support structures are cylindrical, rectangular, elliptical, of another shape, or of an irregular shape.

13. The microarray reaction device of claim 1, wherein the heights of the support structures are equal among the support structures.

14. The microarray reaction device of claim 1, wherein the height of the support structure is higher than the height of the boss by about 0.01 mm to about 10 mm.

15. The microarray reaction device of claim 1, wherein the material of the cover sheet comprises plastic, glass, silicon, ceramics, or at least one kind of metal.

16. The microarray reaction device of claim 1, wherein the cover sheet and the boss are one piece.

17. The microarray reaction device of claim 1, wherein the number of through-holes and the number of bosses are unequal.

18. The microarray reaction device of claim 1, wherein the cover sheet and the boss are connected by gluing, welding, anodic bonding, or ultrasonic welding, or any combination thereof.

19. The microarray reaction device of claim 1, wherein the cover sheet comprises at least one boss without a through-hole between two bosses with through-holes.

20. The microarray reaction device of claim 1, comprising a plurality of bosses, wherein the support structures located substantially at the center of the cover sheet is located between two bosses.

21. The microarray reaction device of claim 1, wherein the cover sheet comprises at least two support structures that are substantially at the middle edge of the cover sheet.

22. A method for conducting an assay, comprising:
providing the microarray reaction device of claim 1;
delivering a sample to the one or more array areas through the one or more through-holes;
allowing a reaction of the assay to occur in the one or more array areas; and
assessing the assay result.

* * * * *